(12) United States Patent
Chebiyyam et al.

(10) Patent No.: US 12,164,058 B2
(45) Date of Patent: Dec. 10, 2024

(54) RADAR DATA ANALYSIS AND CONCEALED OBJECT DETECTION

(71) Applicant: Zoox, Inc., Foster City, CA (US)

(72) Inventors: Venkata Subrahmanyam Chandra Sekhar Chebiyyam, San Francisco, CA (US); Subasingha Shaminda Subasingha, San Ramon, CA (US); Joshua Kriser Cohen, Sunnyvale, CA (US); Chuang Wang, Sunnyvale, CA (US); Samantha Marie Ting, Redwood City, CA (US); Badeea Ferdaous Alferdaous Alazem, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 698 days.

(21) Appl. No.: 17/384,430

(22) Filed: Jul. 23, 2021

(65) Prior Publication Data

US 2023/0142674 A1 May 11, 2023

(51) Int. Cl.
*G01S 7/41* (2006.01)
*G01S 13/931* (2020.01)

(52) U.S. Cl.
CPC .............. *G01S 7/41* (2013.01); *G01S 13/931* (2013.01)

(58) Field of Classification Search
CPC .................................. G01S 7/41; G01S 13/931
See application file for complete search history.

(56) References Cited

U.S. PATENT DOCUMENTS

| | | | |
|---|---|---|---|
| 10,553,117 B1 * | 2/2020 | Johnson | B60W 30/0956 |
| 11,231,481 B1 * | 1/2022 | Cohen | G01S 7/2927 |
| 11,396,282 B2 * | 7/2022 | Kim | G01S 7/412 |
| 11,709,260 B2 * | 7/2023 | Alferdaous Alazem | G01S 13/89 342/52 |
| 2012/0146839 A1 * | 6/2012 | Hidume | G01S 13/345 342/146 |

(Continued)

FOREIGN PATENT DOCUMENTS

| | | |
|---|---|---|
| KR | 20130040642 A | 4/2013 |
| KR | 102060286 B1 | 12/2019 |
| KR | 20200067629 A | 6/2020 |

OTHER PUBLICATIONS

Copy of the PCT Search Report and Written Opinion mailed Nov. 16, 2022 for PCT application No. PCT/US2022/037825, 12 pages.

*Primary Examiner* — Peter M Bythrow
(74) *Attorney, Agent, or Firm* — Lee & Hayes, P.C.

(57) ABSTRACT

Techniques are discussed herein for analyzing radar data to determine that radar noise from one or more target detections potentially conceals additional objects near the target detection. Determining whether an object may be concealed can be based at least in part on a radar noise level based on a target detection, as well as distributions of radar cross sections and/or doppler data associated with particular object types. For a location near a target detection, a radar system may determine estimated noise levels, and compare the estimated noise levels to radar cross section probabilities associated with object types to determine the likelihood that an object of the object type could be concealed at the location. Based on the analysis, the system may determine a vehicle trajectory or otherwise may control a vehicle based on the likelihood that an object may be concealed at the location.

20 Claims, 9 Drawing Sheets

(56) References Cited

U.S. PATENT DOCUMENTS

| | | | |
|---|---|---|---|
| 2013/0002470 A1* | 1/2013 | Kambe | G01S 13/931 |
| | | | 342/55 |
| 2015/0331098 A1* | 11/2015 | Luebbert | G01S 7/354 |
| | | | 342/91 |
| 2017/0176641 A1* | 6/2017 | Zhu | G05D 1/0088 |
| 2019/0243371 A1* | 8/2019 | Nister | G05D 1/0223 |
| 2019/0293769 A1* | 9/2019 | Subasingha | G01S 17/02 |
| 2020/0090322 A1* | 3/2020 | Seo | G06N 3/084 |
| 2020/0309923 A1* | 10/2020 | Bhaskaran | G01S 17/87 |
| 2021/0026355 A1* | 1/2021 | Chen | G06F 18/22 |
| 2021/0064040 A1* | 3/2021 | Yadmellat | G05D 1/0214 |
| 2021/0406560 A1* | 12/2021 | Park | G06T 7/70 |
| 2022/0129726 A1* | 4/2022 | Marina | G06N 3/04 |
| 2022/0187418 A1* | 6/2022 | Bialer | G01S 7/292 |
| 2022/0413129 A1* | 12/2022 | Fan | G01S 7/0231 |
| 2023/0131721 A1 | 4/2023 | Chebiyyam | |

* cited by examiner

RADAR DATA ANALYSIS AND CONCEALED OBJECT DETECTION

BACKGROUND

Radar generally measures the distance from a radar device to the surface of an object by transmitting a radio wave and receiving a reflection of the radio wave from the surface of the object, which may be read by a sensor of the radar device. The sensor may generate a signal based at least in part on radio waves incident on the sensor. This signal may include a return signal attributable to the reflection, but the signal may also include portions attributable to noise and/or other interfering signals (whether from the radar device itself or from an external source). To distinguish a return signal from noise or other interfering signals, radar devices generally use a detection threshold for suppressing false positive detections (i.e., identifying a portion of the signal as being a return when, in fact, the portion of the signal is attributable to noise and/or other interfering signals). In some situations, however, this may be problematic (and dangerous) as such suppressions may be associated with real returns

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
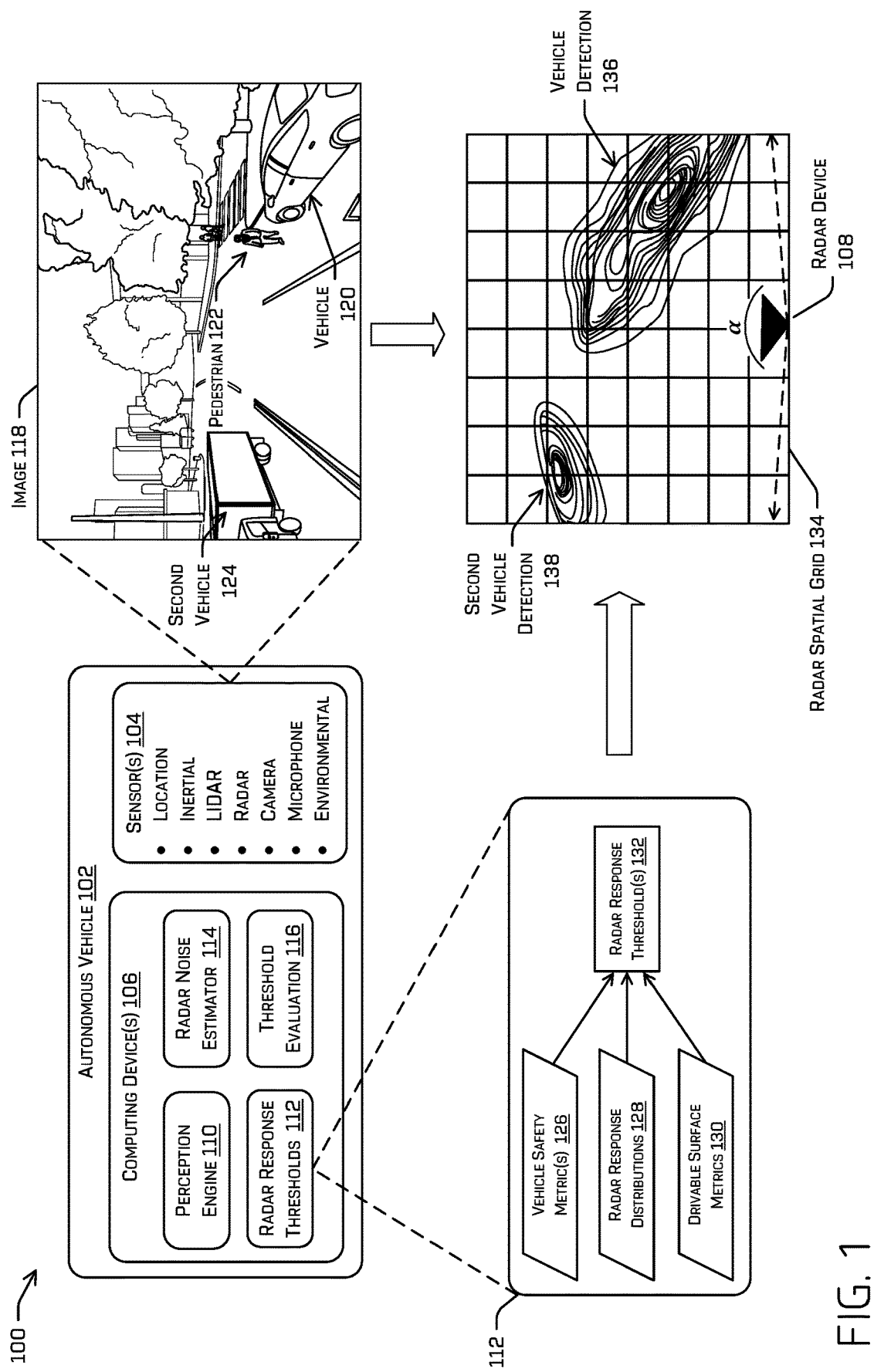
FIG. 1 illustrates an example scenario in which a radar device of an autonomous vehicle receives and analyzes radar data, including data in which an object may be concealed by radar noise associated with a detection, in accordance with one or more implementations of the disclosure.

The techniques discussed herein relate to analyzing radar data generated by a vehicle traversing an environment, and determining that radar noise based on one or more target detections may potentially conceal additional objects near the detected targets. As described in various examples below, a radar system may determine radar noise levels based on side lobe levels associated with targets detected in the environment. Radar response thresholds, including radar cross section (RCS) thresholds and/or doppler thresholds associated with particular object types may be determined based on radar response distributions associated with the object types. For instance, one or more radar response thresholds may be calculated based on distributions from a pedestrian object type, and a predetermined probability and/or confidence threshold (e.g., 95%) associated with detecting pedestrians within the radar noise. For a particular location (or region) near a target detection, a radar system may determine estimated noise levels for the location, and compare the estimated noise levels to RCS and/or doppler threshold values associated with one or more object types, to determine the likelihood that an object of the object type may be concealed at the location. Based on the analysis of the radar data, the vehicle may determine a trajectory or otherwise control the vehicle based on the likelihood that one or more object may be concealed at the location.

Analysis of radar data to detect objects may include techniques for reducing or suppressing false positive detections. A false positive detection may include a determination of an object detection within the radar data caused by radar noise, rather than a physical object in the environment. Conventional techniques for radar false positive suppression include determining a detection threshold to reduce the number of false positives and/or to keep the number of false positives below a specified false positive rate. For instance, constant false alarm rate techniques (CFAR), such as cell-averaging CFAR (CA-CFAR) may test each cell (or portion) of radar data to determine if a signal associated with a cell of interest meets or exceeds a detection threshold determined by averaging the signal of the cell of interest and/or signals associated with cells around the cell of interest. Such techniques presume that, when the cell of interest includes a return signal (e.g., radar response data indicating a detected object), the surrounding or nearby cells are likely to provide a good estimate of the radar noise in the scanned region. Other techniques may be used alternately or additionally to a CFAR technique, such as selecting a maximal portion of a signal associated with a cell as a return signal.

However, the application of false positive suppression techniques for radar data may tend to increase the number of false negative detections, in which a response signal caused by a physical object detected in the environment is attributed to radar noise and suppressed. For example, an estimate of radar noise in a region of the environment may conceal radar detections of a smaller and/or less radar reflective objects that fall below a noise threshold. For autonomous vehicles, false negative radar detections that represent failures in identifying physical objects in the environment may presents significant risks to the safety of the vehicle, the occupants, and the surrounding environment.

To address the technical problems of radar false positive and false negative detections, the techniques discussed herein may include determining thresholds based on radar response distributions for specific object types, to determine drivable and non-drivable surfaces for a vehicle within an environment. As described in various examples below, a radar noise estimator may use the locations and attributes of targets detected within the radar data to determine estimated radar noise levels at other locations near the detected targets. An object type threshold component may determine various thresholds (e.g., RCS and/or doppler thresholds) associated with particular object types (e.g., pedestrians) which may be compared to the noise levels at various locations in the environment to determine the drivable and non-drivable surfaces.

A non-drivable surface may be a region/location in the environment in which the radar noise level is sufficiently high (e.g., meets or exceeds a threshold) so that the area potentially conceals one or more objects. Although a physical object may or may not be present at a location in a non-drivable surface, the radar noise may make the non-drivable surface effectively unscannable by the radar device. Therefore, the control and navigation systems of the vehicle may presume that each location (e.g., one or more radar cells) of the non-drivable surface includes an object, even if the presence of an object cannot be verified. In contrast, a drivable surface may be a region/location in the environment in which the radar noise level is below a threshold, indicating that the radar noise could conceal an object with a predetermined probability or degree of confidence. As described below in more detail, the thresholds used to determine drivable and non-drivable surfaces may be associated with particular object types (e.g., pedestrians) and with predetermined probabilities based on object distributions. For instance, a threshold may be a value determined so that it includes the radar responses from 95% of pedestrians in the environment. A different threshold may be a different value determined to include radar responses from a different percentage (e.g., 90%, 99%, etc.) of pedestrians, or a predetermined percentage of a different object type (e.g., bicycles, vehicles, animals, etc.) in the environment. As described in more detail below, object type-specific radar response thresholds may include signal power values (e.g., RCS values or other indications of radar reflective power or intensity), doppler values, or a combination of power and doppler values.

In some examples, a radar response threshold associated with an object type may be determined based on a predetermined probability value for objects of the object type. For instance, based on a desired probability of 95% of pedestrians, a pedestrian RCS distribution may be used to determine a corresponding RCS threshold value, and/or a pedestrian doppler distribution may be used to determine a corresponding doppler threshold value. In other examples, a predetermined threshold value may be used to determine the corresponding probabilities (or confidence levels) associated with the threshold value. For instance, based on an RCS radar response threshold of −50 dB, the pedestrian RCS distribution may be used to determine the percentage of pedestrians that exceed the threshold. The percentage of pedestrians exceeding the threshold also may correspond to the likelihood that, if a pedestrian is present at that location in the radar data, then the RCS of the pedestrian will exceed the threshold and the pedestrian will be visible to a radar system applying the threshold as a noise level threshold.

Object type radar response thresholds, including RCS thresholds and/or doppler thresholds, also may be modified up or down during the operation of a vehicle, to improve the vehicle safety and/or driving efficiency as needed. For instance, the components of the vehicle may tune the radar response threshold(s) used for one or more object types, to change the drivable and non-drivable surfaces determined for the vehicle based on the threshold(s). For instance, if the environment around the vehicle does not include sufficient drivable surface to allow the vehicle to traverse the environment, the object type threshold component may increase the radar response thresholds to increase the amount of the drivable surface available to the vehicle. In contrast, if the environment includes more than sufficient drivable surfaces, then the object type threshold component may increase one or more radar response thresholds to increase the confidence level that a potential object could not be concealed by the radar noise in the environment.

As described below in more detail, in some examples multiple different thresholds may be defined for different doppler ranges. In some instances, the estimated radar noise level for a region in the environment may be based on the difference in radar range between the region and a nearby target detection location, as well based on the difference in radar measurements (e.g., doppler and/or RCS) between the region and the target detection location. For instance, as the doppler difference increases between the target detection location and the separate location, the estimated noise level at the separate location may decrease. As a result, different radar signal power (e.g., RCS) thresholds may be determined and applied for different doppler ranges. The different thresholds may be evaluated for the different doppler ranges, and used with the associated object-specific probabilities of the different doppler ranges, to determine a total probability (e.g., by summing separate probabilities for different doppler ranges) that an object of the object type could be concealed at the location.

In at least some examples, multiple determinations may be made for varying object types within the radar data. For radar data mappings such as grids, non-grid mappings of cells and/or radar data contours, drivable and non-drivable surface maps may be determined for a vehicle with respect to one or more different object types. For instance, drivable/non-drivable surface maps based on potential concealed pedestrians may differ from maps based on potential concealed bicyclists, etc. In some examples, an autonomous vehicle may generate a trajectory for controlling operation of the autonomous vehicle based at least in part on one or more drivable/non-drivable surface maps according to the techniques discussed herein. Additionally or alternatively, the autonomous vehicle may activate a collision avoidance system (CAS), a remote teleoperations computing device, and/or may engage or disengage certain autonomous driving features, based on the drivable/non-drivable surface maps and/or the determination of potentially concealed objects based on the techniques discussed herein.

Additionally, in some examples the techniques described herein may additionally or alternatively including determining estimated radar noise levels, object specific radar response thresholds, and/or drivable/non-drivable surfaces based on object detections and other sensor data received from an additional or alternate sensor modality (e.g., cameras, LIDAR sensors, etc.). In some instances, various techniques described herein (e.g., radar noise estimation for locations in the environment, radar response threshold determinations for object types, and threshold-based drivable/non-drivable surface determinations, etc.) may be performed in response to determining that other vehicle sensors such as cameras or LIDAR sensors may be occluded or obscured by steam, light flares, reflections, etc. Additionally or alternatively, the techniques described herein may be performed in a first operation, after which any locations that are determined as potentially concealing pedestrians (or objects of other object types) may be provided to additional operations using other sensor modalities to further analyze the locations (e.g., visual object recognition and analysis, etc.).

The techniques described herein of determining locations in radar data at which an object may potentially be concealed, additionally or alternatively may comprise receiving and/or determining a radar response profiles (or response profiles) associated with various object types. A response profile may parameterize characteristic(s) of an object type that affect a manner in which the object type reflects radio waves and, therefore, how the object type "shows up" in a radar sensor output signal. For example, the response profile may comprise a received power and/or RCS associated with the object type. In some examples, values of the received power and/or RCS indicated by the response profile may be deterministic or, in additional or alternate examples, the values may be probabilistic, (e.g., indicated by probability distribution functions associated with the object type). In some instances, likelihoods that an object would or would not be detected may be determined for one or more object types. For example, the techniques may comprise determining a first likelihood that a pedestrian would not be detected as particular location, a second likelihood that a large vehicle would not detected at the location, a third likelihood that a small vehicle would not be detected, a fourth likelihood that a traffic sign would not be detected, and so on. In some examples, the techniques may comprise storing a response profile in association with an object type, object size, object reflectivity, and/or the like. In some examples, the response profile may be indexed by distance, azimuth, and/or doppler.

The techniques may additionally or alternatively comprise determining a likelihood associated with an object type and a portion of the environment (e.g., for different bins of ranges (or distances), azimuths, dopplers, and/or elevations). The techniques may comprise associating a likelihood with a portion of a radar spatial grid. For example, a radar spatial grid may comprise a plurality of cells, each of which may represent different portions of the environment and/or different bins of radar data. In some examples, a cell may have one or more likelihoods associated therewith, wherein each likelihood may be associated with a different object type.

In some examples, an autonomous vehicle may generate a trajectory for controlling operation of the autonomous vehicle based at least in part on the radar spatial grid. The techniques may thereby improve the safety and efficacy of operation of the autonomous vehicle. Moreover, the techniques discussed herein may enable a computer to infer the existence of a potential false negative in radar data without needing to receive the raw radar signal and/or without (proprietary) information regarding the algorithm by which the radar device generates detections.

FIG. 1 illustrates an example scenario 100 including an autonomous vehicle 102 configured to use radar response thresholds associated with objects to determine drivable and non-drivable surfaces in an environment. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to airspace object detection, manufacturing, augmented reality, etc. Moreover, even though the autonomous vehicle 102 is depicted as a land vehicle, in some examples the autonomous vehicle 102 may be a spacecraft, watercraft, and/or the like.

According to the techniques discussed herein, the autonomous vehicle 102 may receive sensor data from sensor(s) 104 of the autonomous vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the autonomous vehicle 102 and data capture, processing, commands, and/or controls may be communicated to/from the autonomous vehicle 102 by one or more remote computing devices via wired and/or wireless networks.

FIG. 1 depicts an example of a radar device 108, which may be associated with autonomous vehicle 102 and/or may collect radar sensor data as the autonomous vehicle 102 traverses the environment. In some examples, the radar device 108 may have a field of view, u, covering at least a portion of the environment surrounding the autonomous vehicle 102, i.e., a scanned region. In various examples, the autonomous vehicle 102 may have any number of one or more radar devices and/or sensors (1, 2, 4, 5, 8, 10, etc.). In the illustrated example, the field of view, u, is depicted as being approximately a 180-degree view. However, in other examples, the field of view of the radar sensors can be greater than (e.g., 220 degrees, 270 degrees, 360 degrees) or less than (e.g., 120 degrees, 90 degrees, 60 degrees, 45 degrees) this angle. Moreover, the autonomous vehicle 102 may include multiple radar sensors having multiple different fields of view, distances, scan rates, and the like. In some examples, the autonomous vehicle 102 may include multiple radar sensors with at least partially overlapping fields of view such that multiple radar sensors capture at least portion of the environment in common.

The computing device(s) 106 may comprise a perception engine 110 configured to determine what is in the environment surrounding the autonomous vehicle 102. Although not shown in FIG. 1, computing device(s) 106 also may comprise a prediction component including functionality to generate predicted information associated with the environment, and a planning component including functionality to determine how to operate the autonomous vehicle 102 within the environment based on information received from the perception engine 110. The perception engine 110 may include one or more machine-learned (ML) models and/or other computer-executable instructions for detecting, identifying, segmenting, classifying, and/or tracking objects from sensor data collected from the environment of the autonomous vehicle 102. In some examples, the computing device(s) 106 also may include a radar response threshold component 112, a radar noise estimator 114 and/or a threshold evaluation component 116. As described below in more detail, the radar response threshold component 112 may include functionality to determine the radar response thresholds that may be applied by the autonomous vehicle 102 while driving in an environment. The radar response thresholds may be determined based on vehicle safety metric(s), object type radar response distributions, and/or drivable surface metrics, to balance the possibility that an object may be concealed by radar noise in a region of the radar data, with the desirability for the autonomous vehicle 102 to determine a safe and efficient route to traverse the environment. The radar noise estimator 114 may be configured to determine estimations of radar noise (e.g., RCS noise and/or doppler noise) based on detections of objects by the radar device(s) 108 on the autonomous vehicle 102. Radar noise received by radar device(s) 108 may be based on the side lobe levels generated by objects reflecting radar transmission signals. As described below in more detail, the radar noise at a location near a target detection may be based on the range difference between the target detection and the location, the doppler difference between the target detection and the location, and the power (e.g., intensity) of the target detection. The threshold evaluation component 116 may evaluate the radar response thresholds (e.g., RCS and/or doppler thresholds) associated with particular types of objects (e.g., pedestrians, bicycles, animals, cars, etc.) against the estimated radar noise levels in different regions of the radar data, to determine drivable and non-drivable surfaces for the autonomous vehicle 102.

In some examples, computing device(s) 106 may receive radar data from one or more radar devices 108. For instance, a radar device may receive return signals (e.g., radio waves reflected from an object) based on transmitted signals, and may determine estimated noise levels based at least in part on properties of the return signals, such as the average magnitude and/or average power. The properties of the return signals may depend on a hardware and/or software configuration of the radar device (e.g., depending on the kind of CFAR algorithm used by the radar device). In some cases, radar noise levels may be depicted as a constant noise floor, although additional or alternate noise floor types are contemplated, as discussed further herein. In some examples, the radar device may output an object detection associated with a portion of a return signal that meets or exceeds a radar noise level. When outputting return radar signals and/or object detections, a radar device may output location data that indicates a distance (e.g., range), azimuth (e.g., scanning angle at which the object was detected), doppler, elevation, received power (e.g., magnitude and/or power of the return signal), SNR, and/or RCS associated with a detected object. In various examples, the perception engine 110 may receive radar data that may include object detection(s) and may or may not include data about the original signal from which the object detection(s) were derived and/or the raw signal itself.

Note that the graphs and grids depicted herein are depicted as two-dimensional graphs and grids, although the data represented thereby may be two or more dimensional. For example, radar data and/or object detections may comprise one or more dimensions such as, for example, a received power, distance, azimuth (e.g., scanning angle at which the object was detected), doppler, elevation, received power (e.g., magnitude and/or power of the return signal), SNR, and/or RCS.

In some examples, computing device(s) 106 may additionally or alternatively receive an image 118 from the sensor(s) 104. Image 118 depicts an example scenario in which a radar device may detect one or more targets, and receive radar noise potentially concealing additional objects from detecting a return signal. Generally, the magnitude of the power of a radar return signal may depend on the size, material, orientation, and/or surface angles of the object which reflected the radio waves that cause the return signal. Therefore, large objects, such as the vehicle 120 and truck 124 depicted in image 118 may tend to create larger return signal than smaller objects, such as the pedestrian 122, in a radar signal. In some examples, large return signals, such as the return signal caused by the vehicle 120 and/or truck 124, may skew an estimated noise level determined by the radar device to be higher because of the greater magnitude of the return signal attributable to the larger object. Smaller objects (e.g., objects with lesser magnitude return signals) within a same or similar region, such as pedestrian 122, may go undetected by the radar device because of the skewed noise threshold. The proximity at which an undetected object must be to a larger "skewing" object to go undetected may depend on the technique by which the noise level is set by the radar device. For instance, if the estimated noise level is based on a region of cells, smaller objects within that region may go undetected, whereas if the estimated noise level is determined cell by cell there may be a slightly better probability that a smaller object will be detected.

In some examples, computing device(s) 106 also may include a radar response threshold component 112 configured to determine the radar response thresholds for an autonomous vehicle 102 driving within an environment. Although in this example the radar response threshold component 112 is implemented on the autonomous vehicle 102, in other cases the radar response threshold component 112 may be implemented on separate computing device(s) (e.g., computing devices 938 described below). In such cases, the remote radar response threshold component 112 may use the various techniques described herein to determine and transmit radar response thresholds to one or more autonomous vehicle 102 to be used during driving operations. In still other examples, some portions of the radar response threshold component 112 can be implemented external to the autonomous vehicle 102 to determine generalized data-driven radar response thresholds, while other portions of the radar response threshold component 112 can be implemented on the autonomous vehicle 102 to customize or tune the thresholds to the specific environment, driving conditions, user preferences, etc.

The radar response threshold component 112 may use one or more data items from various different data sources to determine the radar response thresholds to be applied by the autonomous vehicle 102. For instance, as shown in this example the radar response threshold component 112 may receive and use vehicle safety metric(s) 126 to determine the radar response threshold(s). Vehicle safety metrics 126 may include one or a combination of minimum acceptable driving safety standards, such as an accident rate (e.g., collisions per driving mile), an injury rate, vehicle or property damage rate, fatality estimation rate, and the like. Other types of vehicle safety metrics 126 may include near-miss collision rates, speed limit or traffic violation rates, rates of excess braking or acceleration, comfort metric compliance rates and/or any data associated with the performance of the autonomous vehicle 102. In some cases, vehicle safety metric(s) 126 also may be adjusted based on the amount of damage or injury is likely to result if a collision were to occur. For instance, a vehicle safety metric(s) 126 may be revised up or down based on the current speed of the autonomous vehicle 102 and/or the type of object with which the vehicle may potentially collide (e.g., a pedestrian, bicycle or car, versus a traffic sign or mailbox).

When using vehicle safety metric(s) 126 to determine a radar response threshold, in some cases the radar response threshold component 112 may evaluate the false negative and false positive detections (as well as true negatives and true positives) of multiple different possible thresholds. The radar response threshold component 112 then may select a threshold that minimizes the sum of false negatives and false positives, or otherwise provides an efficient balance between possibly failing to detect an object concealed by radar noise in a region of the radar data (e.g., a false negative), and erroneous determining that an object may be concealed when no object is present in that region of the environment (e.g., a false positive).

In some examples, the radar response threshold component 112 may evaluate a particular radar response threshold by applying the threshold to various ground truth driving scenarios. The ground truth driving scenarios may be simulated scenarios, log-based scenarios, and/or live driving scenarios. To evaluate a radar response threshold, the radar response threshold component 112 may apply the threshold during one or more ground truth driving scenarios. By applying the threshold to a region of radar data affected by radar noise from a nearby object detection, the radar response threshold component 112 may determine either that the radar noise at the region is sufficiently large to potentially conceal another object (e.g., a positive object detection), or that the radar noise at the region is insufficiently to conceal another object (e.g., a negative object detection). The radar response threshold component 112 then may verify the positive or negative object detection using the ground truth data, which may include data from other sensor modalities (e.g., lidar or image data), or manually labeled or verified data to confirms whether or not an object is present at the region. Based on the positive or negative object determination using the radar response threshold, and the corresponding verification with the ground truth data, the radar response threshold component 112 may identify the determination is one of a true positive, true negative, false positive, or false negative determination. The radar response threshold component 112 may perform multiple such analyses for the radar response threshold in multiple different driving scenarios, and then may combine and extrapolate the results out into a number (or rate) of accidents, collisions, damage/injuries, or other vehicle safety incidents. Thus, the radar response threshold component 112 may determine vehicle safety metrics associated with particular radar response thresholds, or vice versa to determine a radar response threshold(s) 132 to be applied by the autonomous vehicle 102 based on a provided target or desired vehicle safety metric(s) 126.

As noted above, the radar response threshold component 112 also may use radar response distributions 128 in some examples to determine radar response threshold(s) 132 for the autonomous vehicle 102. Radar response distributions 128 may include power distributions (e.g., RCS distributions) and/or doppler distributions, and may be associated with particular object types (e.g., pedestrians, bicycles, cars, trucks, animals, etc.). Using one or more radar response distributions 128, the radar response threshold component 112 may determine a radar response threshold(s) based on a desired probability of objects of the object type (e.g., 95% of pedestrians) that the threshold(s) will detect.

Additionally or alternatively, the radar response threshold component 112 may determine radar response threshold(s) 132 using drivable surface metrics 130. A drivable surface metric 130 may include a minimum amount and/or percentage of the region around the autonomous vehicle 102 that is to be designated as a drivable surface. For instance, based on a predetermined drivable surface metric 130 of 60%, the radar response threshold component 112 may determine the corresponding radar response threshold(s) 132 that results in 60% of the regions (e.g., radar cells) around the autonomous vehicle 102 being driving.

In some examples, the radar response threshold component 112 may determine radar response threshold(s) 132 for an autonomous vehicle 102, based on a combination of and/or balancing between the vehicle safety metric(s) 126 and drivable surface metric(s) 130, to provide both a high level of vehicle safety and driving efficiency through the environment. As described below, when a relatively large radar response threshold(s) 132 is selected, the threshold evaluation component 116 may identify fewer regions of radar data as potentially concealing objects within the radar noise, and thus may have more overall drivable surface regions. In contrast, when a relatively small radar response threshold(s) 132 is selected, the threshold evaluation component 116 may identify more regions of radar data as potentially concealing objects, resulting in less overall drivable surface regions. In some cases, the radar response threshold component 112 may determine a maximum radar response threshold(s) 132 that complies with a predetermined vehicle safety metric(s) 126, and a minimum radar response threshold(s) 132 that complies with predetermined drivable surface metric(s) 130. In such cases, the radar response threshold component 112 may select a radar response threshold(s) 132 between the determine minimum and maximum, in order to comply with both the desired vehicle safety metrics 126 and drivable surface metrics 130.

In some examples, a general radar response threshold may be determined by a remote computing system using the techniques described herein, and may be transmitted to the autonomous vehicle 102 where it is modified based on the current driving environment. For instance, the radar response threshold component 112 may tune a general radar response threshold up or down, to determine a specific radar response threshold 132, based on the current route, traffic conditions, time of day, number of pedestrians (or other objects) in the environment, etc. Based on the environmental conditions, the radar response threshold component 112 may determine that the radar response threshold should be decreased to enhance the vehicle safety in the current environment, or increased to increase the amount of drivable surface in the environment.

Additionally or alternatively, a general radar response threshold may be tuned up or down based on the current driving environment and/or driving conditions of the autonomous vehicle 102. For instance, the radar response threshold component 112 may perform a first modification to the general radar response threshold when the autonomous vehicle 102 is driving in a city, and a second modification to the general radar response threshold when the autonomous vehicle 102 is driving is a less dense rural environment. The radar response threshold component 112 also may modify the general radar response threshold based on detecting that the autonomous vehicle 102 is driving in inclement weather (e.g., rain, snow, fog, etc.). In some examples, the radar response threshold component 112 also may modify any of the vehicle safety metric(s) 126 based on current driving environment and/or driving conditions of the autonomous vehicle 102.

The radar response threshold component 112 also may tune the radar response threshold(s) 132 up or down for a specific region, or may apply a different object-specific threshold to the regions, based on the type of road surfaces of the regions. For instance, when a radar data region that is potentially affected by radar noise corresponds to a sidewalk, then the radar response threshold component 112 may apply radar response threshold(s) 132 configured to detect pedestrians. In contrast, for a different radar data region corresponding to a different surface type (e.g., a bicycle lane, driving or carpool lane, etc.), the radar response threshold component 112 may apply a different radar response threshold(s) 132 configured to detect different object types (e.g., bicycles, small cars, etc.).

In some examples, the perception engine 110 may determine a probability (or confidence level) that a radar return signal associated with a particular location is a true positive, false positive, true negative, or false negative. For example, to determine the various probabilities for a return signal at a location, the perception engine 110 may use the radar noise estimator 114 to determine an estimated noise floor, use the threshold evaluation component 116 to determine radar response thresholds associated with a particular object type (e.g., pedestrian), and determine a probability of a concealed objected at the location based at least in part on the estimated noise floor and the object type threshold(s). The radar noise estimator 114 may determine one or more estimated noise levels at the location based at least in part on one or more object detections received from a radar device, and the radar response threshold component 112 may use distributions associated with a particular object type to determine RCS and/or doppler thresholds associated with the object type and/or different object parameters (e.g., size, estimated reflectivity).

Based on the estimated noise level at a location, and the radar response thresholds for various object types, the perception engine 110 may determine whether the location is sufficiently likely (e.g., meeting or exceeding a probability threshold) to contain an object of the object type. In other words, the perception engine 110 may determine whether, based on the estimated radar noise and object types thresholds, the radar device is capable of detecting an object of the object type in a particular region of the environment associated with the portion of radar data. In some examples, the portion of radar data may be defined to be a bin or some other portion thereof representing a portion of the environment. A bin may comprise radar data associated with a set of distances, azimuths, elevations, and/or received powers. For example, a particular bin may include the received power data associated with any object detections associated with a range of azimuths, distances, and/or elevations specified by the bin. In some instances, a bin may be associated with and/or represented as a cell in a radar spatial grid 134, as discussed in more detail below. Although a radar spatial grid 134 is used in this example, in other cases the radar data for the environment may be represented in other non-grid configurations of radar cells, radar-based contour lines, etc. In some examples, a bin may be associated with a set constant and/or range of values in one or more dimensions of the radar data. For example, a bin may be associated with a constant elevation, a range of distances, a range of azimuths, and/or any doppler value.

The perception engine 110 may additionally or alternatively utilize sensor data captured by sensor(s) 104 to generate and maintain one or more spatial grids, including a radar spatial grid 134, that may include cells associated with regions of the environment. Each cell of the radar spatial grid 134 may be associated with a bin (or other portion) of radar data. In some examples, the perception engine 110 may determine whether the radar data associated with a cell is likely to include a concealed object, and may indicate whether the likelihood meets or exceeds a threshold associated with the object type. In some instances, a cell of the radar spatial grid 134 may alternatively or additionally comprise a designation of being occupied by an object (e.g., at least one object detection was output by the radar device or another system of the autonomous vehicle 102 in association with a region of the environment corresponding to the cell), and/or additional metadata related to such a detection, e.g., other data determined by perception engine 110 as discussed in more detail herein such as, for example, a semantic label, lidar points, lidar instance segmentation, radar instance segmentation, and/or the like.

The radar spatial grid 134 is shown as an 8×8 grid for simplicity in this example. However, in other examples, any size (e.g., area in the real world associated with the spatial grid), shape (e.g., length and width of the spatial grid), and resolution (e.g., size of cells used to make up the spatial grid) may be used for the radar spatial grid 134 depending on the accuracy and precision needed, bin dimensions, memory size constraints, processing speed and load constraints, sensor range limitations, and/or the like. In some examples, a spatial grid may be sized and shaped to match a reliable range of the sensor(s) 104 that are used to capture sensor data from which the spatial grid is populated, and the resolution may be chosen by maximizing accuracy and precision needed for a given application given memory and processing constraints. In some examples, the length and the width may be the same, while in other examples the length and width may be different. In one specific example, the size of the spatial grid may be approximately 50-200 meters wide by approximately 50-200 meters long, with a resolution of 0.25 meters per cell.

In some instances, the perception engine 110 may additionally or alternatively determine a position of the autonomous vehicle 102 determined by a localization engine (not pictured), which may use any sensor data to localize the autonomous vehicle 102, data related to objects in the vicinity of the autonomous vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception engine 110 (including the radar spatial grid 134) may be collectively referred to as "perception data." Once the perception engine 110 has generated perception data, the perception engine 110 may provide the perception data to a prediction component and/or planning component.

A planning component within the computing device(s) 106 may use the perception data, including the radar spatial grid 134 and/or any of the determinations of drivable and/or non-drivable surfaces discussed herein, to localize a position of the autonomous vehicle 102 on a global map and/or a local map (which may additionally or alternatively be accomplished by an unillustrated localization component), determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown). For example, the planning component may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second) and based at least in part on the radar spatial grid 134 (e.g., in order to avoid any of the detected objects, as well as incorporate likelihood(s) of where an object may be concealed by radar noise and not detected by a radar device). For example, radar spatial grid 134 includes vehicle detection radar data 136 corresponding to the vehicle 120, and second vehicle detection radar data 138 corresponding to the truck 124. The perception engine 110 may analyze the radar data to determine estimated noise levels associated with the locations on the radar spatial grid 134, radar response thresholds associated with particular object types and probability thresholds, and may determine drivable/non-drivable surfaces on the radar spatial grid 134, from which a trajectory may be generated for the autonomous vehicle 102. FIG. 1 depicts an example of such a trajectory, represented as an arrow indicating a heading, velocity, and/or acceleration, although the trajectory itself may comprise instructions for a PID controller, which may, in turn, actuate a drive system of the autonomous vehicle 102.

Figure 2:
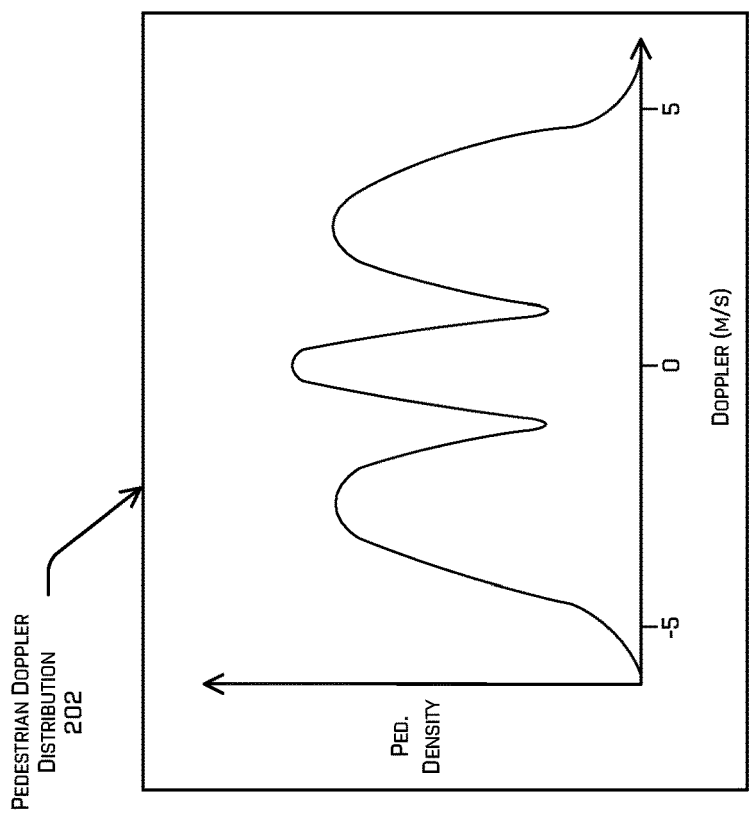
FIG. 2 shows an example radar cross section distribution and an example doppler distribution associated with a pedestrian object type, in accordance with one or more implementations of the disclosure.
Figure 2:
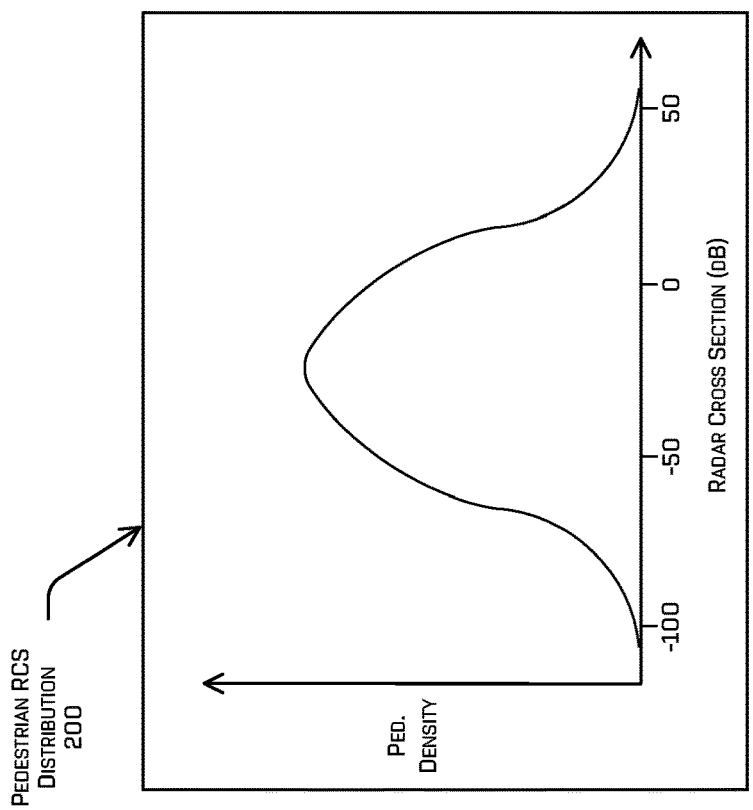

FIG. 2 depicts an example pedestrian RCS distribution 200 and an example pedestrian doppler distribution 202. Although the distributions 200 and 202 are associated with pedestrians in this example, additional RCS and doppler distributions may be associated with other object types (e.g., bicycles, cars, trucks, animals, etc.). The distributions 200 and 202 may be generated by the autonomous vehicle 102, and/or may be generated by separate external computing devices and systems and may be transmitted to the autonomous vehicle 102 for use in determining object type-specific radar response thresholds. The data upon which distributions 200 and 202 are based may include pedestrian data captured by radar devices 108 and/or sensors 104 of vehicles traversing physical environments. For instance, a vehicle may capture and store log data including radar response data from pedestrians in the environment, as well additional sensor data (e.g., camera and/or LIDAR data) used to verify that the radar return signals correspond to pedestrians.

In this example, the pedestrian RCS distribution 200 may correspond to an approximately normal (or Gaussian) distribution. However, in other examples a pedestrian RCS distribution, or RCS distribution for other object types, may correspond to any possible probability distribution function. Individual pedestrian RCS data points within the distribution 200 may be based on, for example, the size of the pedestrians, the surface material associated with the pedestrians (e.g., clothing material, color, reflectivity, etc.), the orientation of the pedestrians with respect to the radar device, and/or the surface angles of the pedestrian which reflect the radio waves that cause the return signal.

The pedestrian doppler distribution 202 in this example corresponds to a trimodal distribution. The trimodal distribution in this example may represent relatively larger numbers of pedestrians moving at walking speed of approximately 2-4 m/s away from the radar device, towards the radar device, and pedestrians that are stationary with respect to the radar device. However, in other examples the distribution 202 may correspond to a uniform distribution, a normal distribution, or any distribution represented a probability distribution function based on pedestrian doppler radar measurements. The individual pedestrian doppler data points within the distribution 202 may be based on the speed of the pedestrians and/or any other measurements captured by a doppler radar device.

Figure 3:
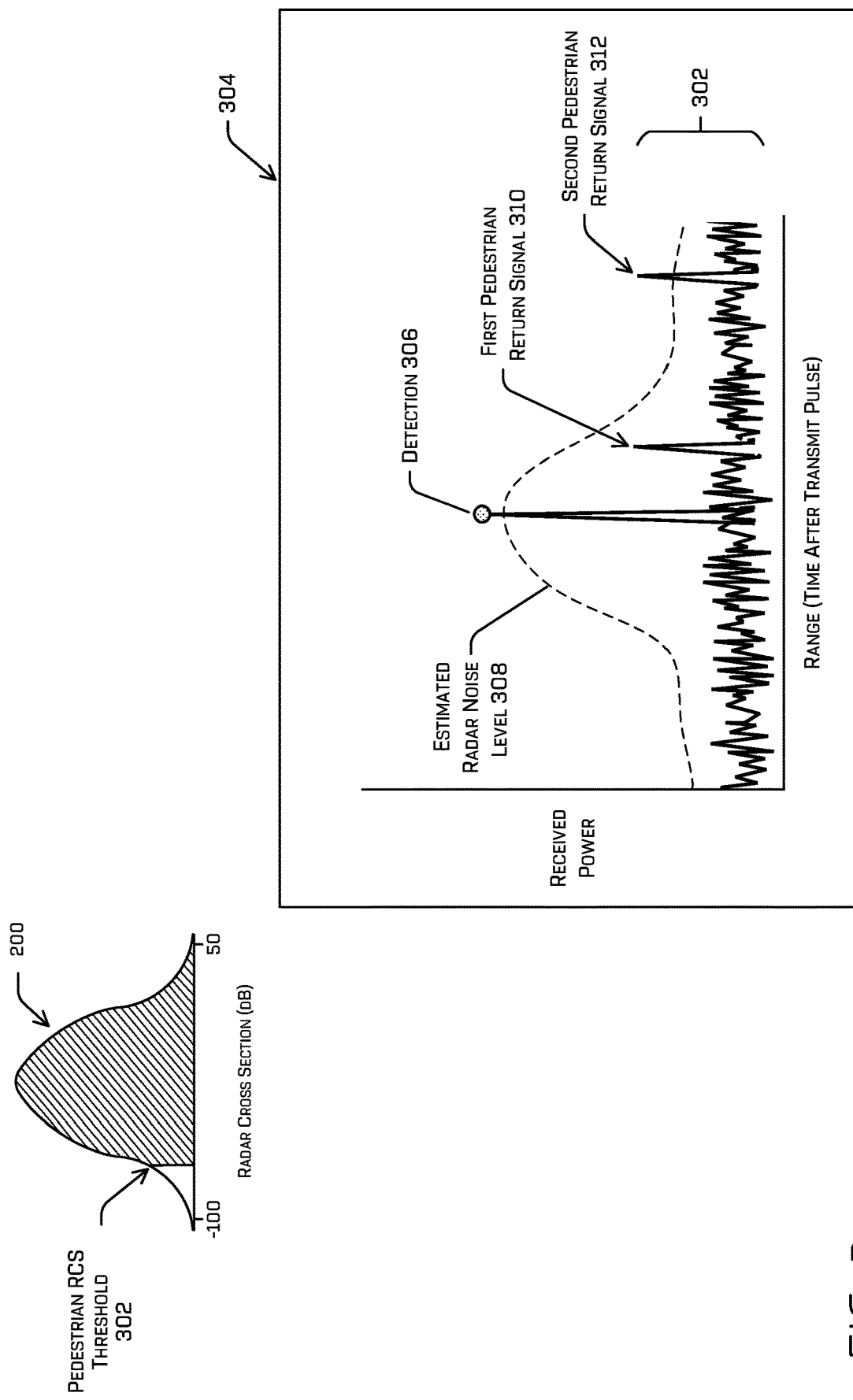
FIG. 3 illustrates an example radar data including a detection, an estimated noise level, and radar return signals based on pedestrians within an environment, in accordance with one or more implementations of the disclosure.

FIG. 3 shows an example radar data analysis, including radar return signals corresponding to a number of object detections in an environment, and an estimated noise level. This example also shows the distribution 200, described above in reference to FIG. 2, in which a probability value and/or confidence level is applied to the distribution to determine a radar response threshold associated with the object type. In this example, the pedestrian RCS distribution 200 includes shaded and non-shaded regions, and indicates a pedestrian RCS threshold value 302. The RCS threshold value 302 may be based on a probability percentile (e.g., $5^{th}$ percentile) of pedestrian RCS values in the distribution 200. A 5% probability may indicate that 95% of the pedestrians detected by the radar device 108 (e.g., the shaded region of distribution 200) should have RCS values that meet or exceed the RCS threshold value 302.

As noted above, the perception engine 110 or other components of the autonomous vehicle 102 may select the probability percentile based on a desired safety standard and/or a confidence level that a radar data region does not conceal a pedestrian. The probability value (e.g., 5%) also may be modified to increase or decrease the value, to tune the corresponding RCS threshold value 302 to improve vehicle safety and/or driving efficiency. For example, lowering the probability from 5% to 2% may result in a lower RCS threshold value, to assure that 98% of the pedestrians detected by the radar device 108 should have RCS values that meet or exceed the lower RCS threshold value. This may result in a higher confidence level that a drivable radar data area does not conceal a pedestrian, but also may result in fewer drivable surfaces. In contrast, raising the percentile value from 5% to 8% may cause a higher RCS threshold value, resulting in more drivable surfaces but a lower confidence level that a drivable radar data area does not conceal a pedestrian.

Although this example describes using a pedestrian RCS distribution 200 and a desired probability or confidence level (e.g., 5%) to determine the RCS threshold value 302, in other examples a pedestrian doppler distribution 202 may be used in a similar or identical manner to determine a doppler threshold value for pedestrians. For instance, in the example doppler distribution 202, a desired probability of 5% may result in a doppler threshold value of −4 m/s, meaning that 95% of observed pedestrians have a doppler measurement that meets or exceeds the −4 m/s threshold value. The pedestrian RCS and doppler distributions 200 and/or 202 also may be used to determine pedestrian RCS and/or doppler ranges, instead of or in addition to RCS and doppler thresholds. For instance, a desired confidence level of 95% for doppler values may correspond to the doppler range between −3 m/s and 3 m/s. In various examples, ranges and/or thresholds for RCS and/or doppler values may be used to determine drivable and non-drivable surfaces.

Additionally, in some examples a pedestrian doppler distribution 202 can be modified when the likely directions of movement of pedestrians (or other objects) can be determined in relation to the autonomous vehicle 102. For instance, the autonomous vehicle 102 may use various components and functionalities described herein (e.g., perception components, maps, localization components, etc.) to determine the vehicle's position in the current environment with respect to a nearby crosswalk, sidewalk, bike path, one-way or two-way street, or other features in the environment. The size, shape, angle, and orientation of these environment features can be used to determine the likely directions of travel for pedestrians, and the radar response threshold component 112 may use these directions to determine a modified pedestrian doppler distribution 202 that reflects a more accurate doppler distribution of pedestrians moving at the determined directions/angles with respect to the vehicle.

Object type radar response thresholds, including RCS thresholds and/or doppler thresholds, also may be modified up or down during the operation of a vehicle, to improve the vehicle safety and/or driving efficiency as needed. For instance, the components of the vehicle may tune the radar response threshold(s) used for one or more object types, to change the drivable and non-drivable surfaces determined for the vehicle based on the threshold(s). For instance, if the environment around the vehicle does not include sufficient drivable surface to allow the vehicle to traverse the environment, the object type threshold component may increase the radar response thresholds to increase the amount of the drivable surface available to the vehicle. In contrast, if the environment includes more than sufficient drivable surfaces, then the object type threshold component may increase one or more radar response thresholds to increase the confidence level that a potential object could not be concealed by the radar noise in the environment.

FIG. 3 also shows a chart 304 indicating an example of received radar data. The radar data shown in chart 304 includes a received power level and range data associated with the received radar data from an example environment. In this example, chart 304 includes an example object detection 306, and an estimated radar noise level 308 based on the object detection 306. The estimated radar noise level 308 at a location (e.g., range from the radar device) may be based at least in part on the range difference between the location and the object detection 306, and the power level of the object detection 306. In some cases, the estimated radar noise level 308 may be based on multiple object detections and/or other attributes of the radar data from surrounding or nearby cells in a scanned region. Examples of various techniques for determining estimated radar noise floors that may be incorporated into the autonomous vehicles 102 to assist in determining locations of potentially concealed objects, and in determining drivable/non-drivable surfaces can be found, for example, in U.S. Pat. No. 16,407,139, filed May 8, 2019, and titled "Radar False Negative Analysis," which is each incorporated herein by reference in its entirety for all purposes.

The radar data chart 304 also includes two examples of radar return signals 310 and 312, representing pedestrians in the environment at locations relatively near the location of the object detection 306. As shown in chart 304, the radar data associated with the object detection 306 overlaps with the radar data from radar return signals 310 and 312, in that the radar data from the different detections may affect the same/overlapping regions in the range and/or doppler dimensions. In this example, the radar return signals 310 and 312 have an identical signal power, which may be the same as the RCS threshold value 302. Because the first pedestrian return signal 310 is located closer (in range) to the location of the object detection 306, it is below the estimated radar noise level 308 and thus might not be detected as a separate object detection by the perception engine 110. In contrast, the second pedestrian return signal 312, which has the same power level but is farther (in range) from the location of the object detection 306, it is above the estimated radar noise level 308 and thus may be detected as a separate object detection by the perception engine 110. Although various pedestrian return signals may be distributed at any RCS level within the distribution 200, this example illustrates that identical pedestrians at the RCS threshold value 302 may or may not be detected based on the difference in range between the pedestrians and the location of the object detection 306. As described below, the point at which the RCS threshold value 302 intersects the estimated radar noise level 308 may correspond to the boundaries of the non-drivable surfaces surrounding the object detection 306.

Figure 4:
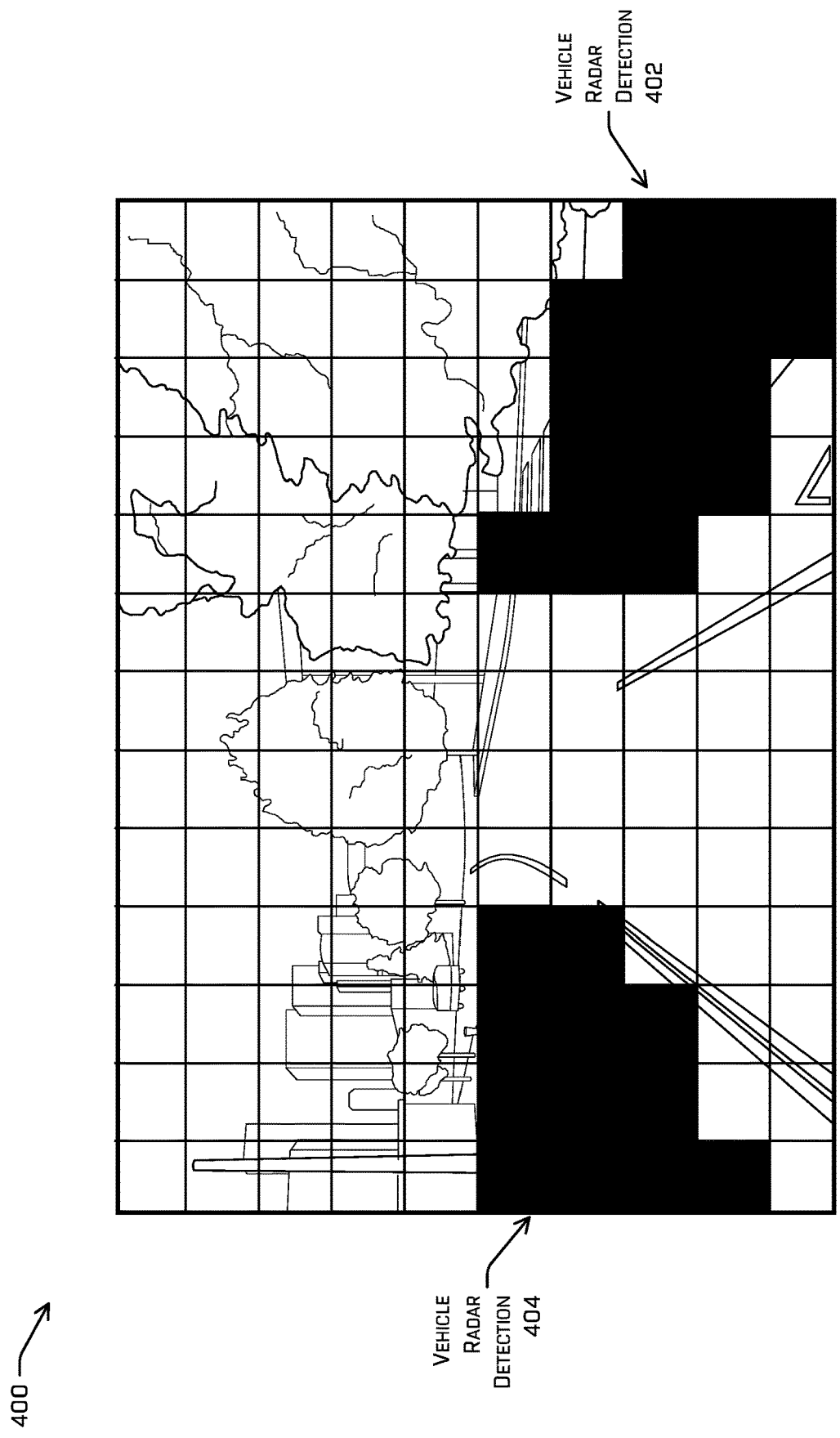
FIG. 4 illustrates an example grid map of an environment associated with an autonomous vehicle, including indications of drivable and non-drivable regions based on radar noise levels and object type-specific thresholds, in accordance with one or more implementations of the disclosure.

FIG. 4 shows an example grid map 400 depicting the environment around an autonomous vehicle 102. The example grid map 400 may correspond to the image 118 described above in reference to FIG. 1, and may represent the same environment surrounding an autonomous vehicle 102. Grid map 400 also includes grid lines corresponding to regions (e.g., groupings of one or more radar cells), and shaded areas to indicate the drivable and non-drivable regions in the environment. In this example, two non-drivable regions are shown corresponding to two vehicle radar detections 402 and 404. The vehicle radar detection 402 may correspond to the vehicle detection radar data 136, and vehicle radar detection 404 may correspond to the second vehicle detection radar data 138. The borders between the black (non-drivable) areas and white (drivable) areas in this example may be the locations where the estimated radar noise level intersects with a radar response threshold associated with an object type. For instance, if the vehicle radar detection 402 corresponds to the object detection 306 in FIG. 3, then the borders of the non-drivable (blackened) area of the vehicle radar detection 402 may be the locations where the estimated radar noise level 308 intersects with the pedestrian RCS threshold value 302.

As noted above, different radar response thresholds, including RCS thresholds and/or doppler thresholds, may be associated with different object types. Therefore, although the example grid map 400 depicts the boundaries between drivable/non-drivable surfaces with respect to the potential for concealed pedestrians within the radar data noise, in other examples different sets of boundaries may be determined for different object types (e.g., bicycles, cars, trucks, animals, etc.). Thus, the perception engine 110 may determine multiple likelihoods for different object types for a single cell. The grid map 400 may have different drivable and non-drivable surfaces associated with a first object type (e.g., "pedestrian," "large vehicle," "passenger vehicle," "cyclist," "four-legged animal") associated therewith. The grid map 400 may additionally or alternatively may comprise indications that a respective cell of the grid map 400, corresponding to a location in the environment around the autonomous vehicle 102, is associated with an estimated noise level that does or does not meet or exceed various object type-specific thresholds, or is not associated with adequate radar data (e.g., due to an occlusion).

Figure 5:
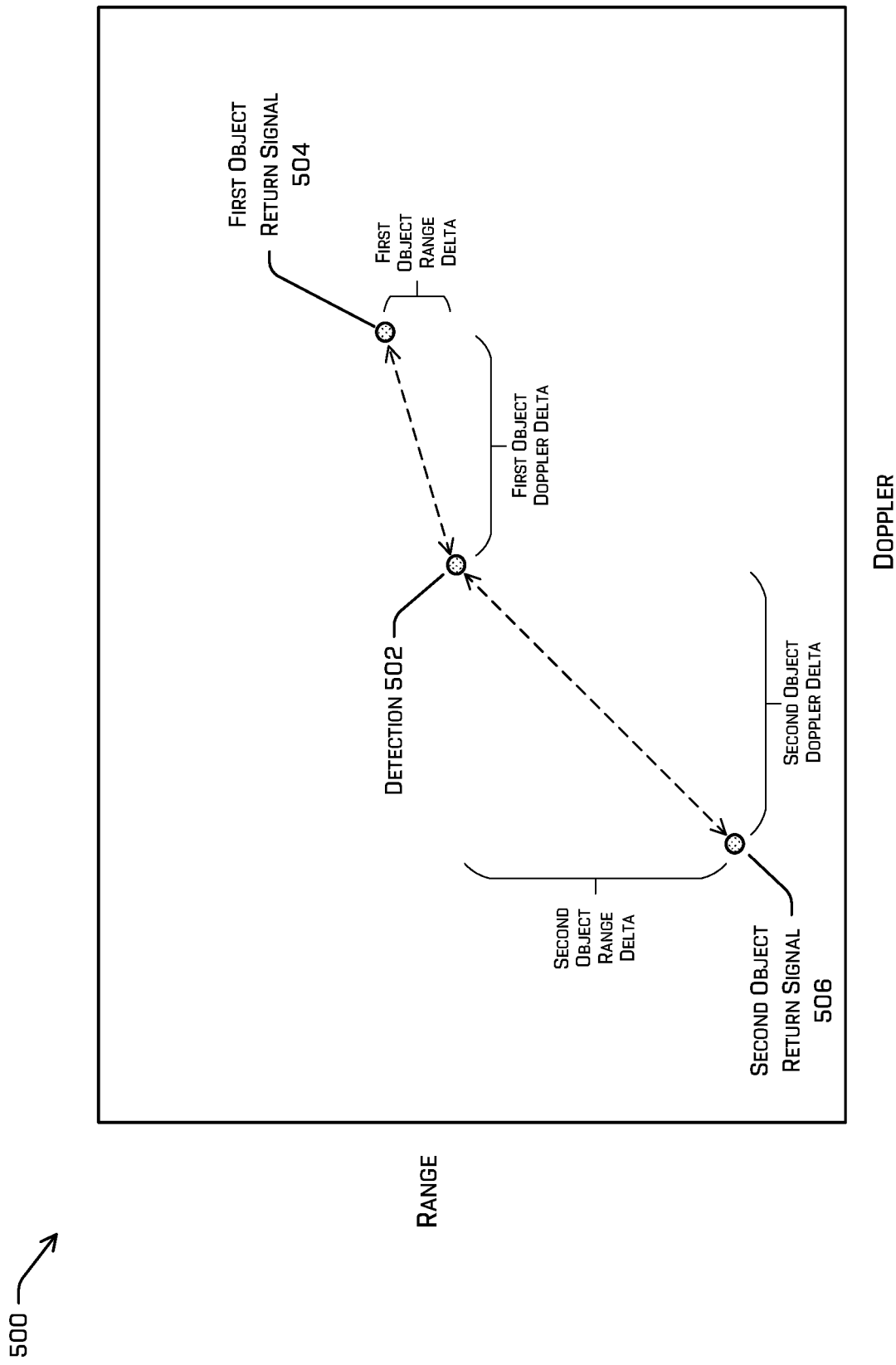
FIG. 5 is a graph illustrating range and doppler deltas between a detection and objects near the detection, in accordance with one or more implementations of the disclosure.

FIG. 5 shows a graph 500 illustrating the differences (or deltas) in range and doppler measurements between a detection 502 of a larger object, and two different object return signals (a first object return signal 504 and a second object return signal 506) corresponding to smaller objects in the environment. As noted above, a larger object with respect to radar data may refer to the magnitude of the radar return signals, and not necessarily the physical size of the object. Rather, the magnitude of the radar return signals may depend on a combination of the size, material, orientation, and/or surface angles of the object which reflect the radio waves that cause the return signal. In this example, the detection 502 may correspond to a larger object, which may generate radar noise that can potentially conceal smaller objects nearby represented by the first object return signal 504 and the second object return signal 506.

In some examples, at least a portion of the radar noise may correspond to the side lobe levels associated with a return signal of a larger object (e.g., detection 502). The side lobe levels associated with an object detection may fluctuate in various different patterns based on the characteristics of the radar device, radar signal, and detected object. However, the side lobe levels at a nearby location generally decrease in intensity as the location moves further from the location of the object detection. Additionally, in some examples the side lobe levels (and corresponding radar noise) associated with a detection 502 of a larger object, may be based on the difference in range between the detection 502 and a nearby location, and on the difference in doppler measurements between the detection 502 and at the nearby location. As shown in this example, the first object return signal 504 has a relatively small difference in range with the detection 502, but a larger doppler difference which may increase the amount of radar noise associated with the first object return signal 504. The second object return signal 506 has a relatively large difference in range with the detection 502, as well as a large doppler difference, which may result in a larger radar noise level associated with the second object return signal 506. Additionally, doppler measurements associated with detections in the radar data may be determined relative to the speed of the autonomous vehicle 102 at the time the doppler measurement was captured.

Figure 6:
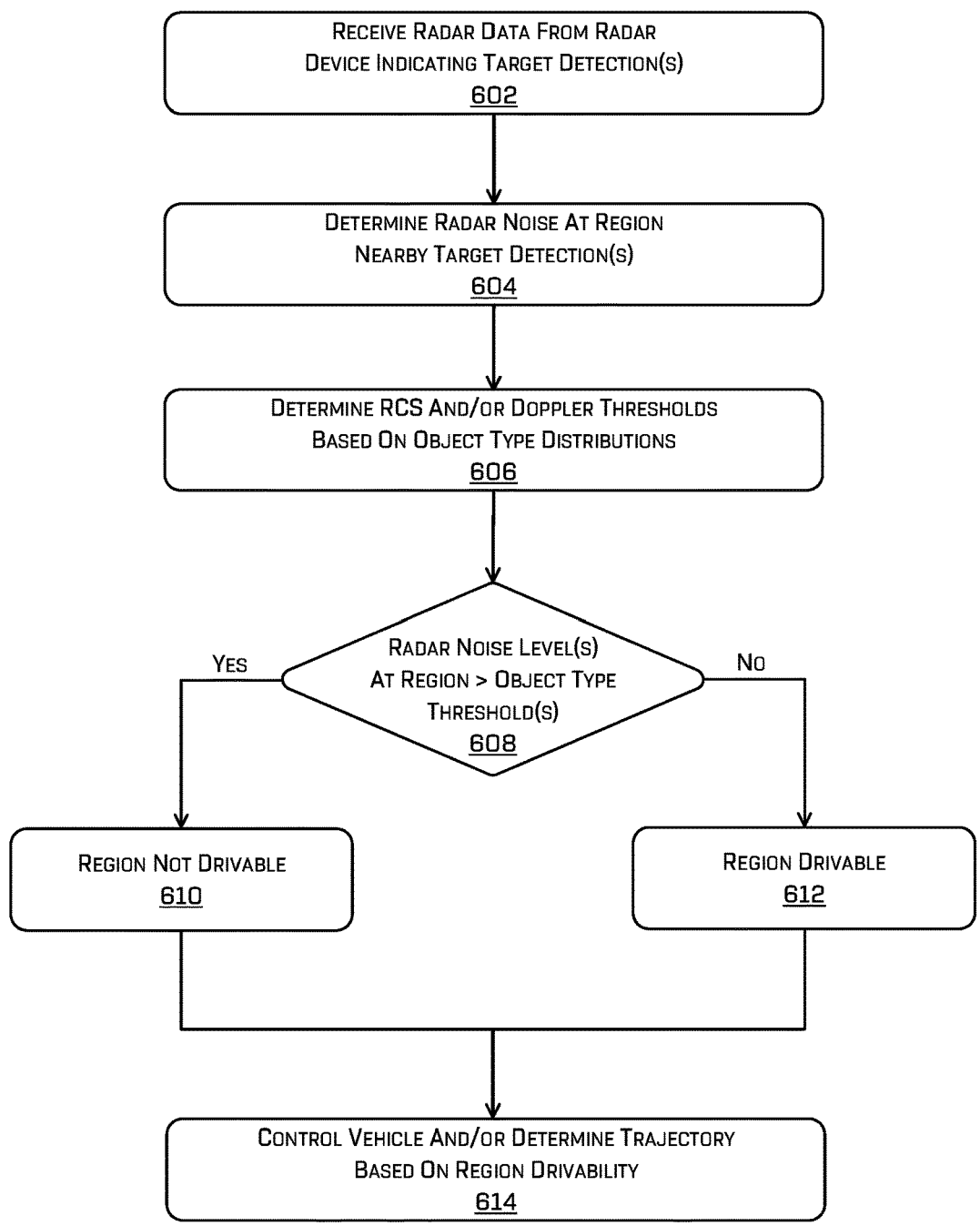
FIG. 6 is a flow diagram illustrating an example process of determining drivable and non-drivable surfaces and controlling a vehicle based on radar data analyses, in accordance with one or more implementations of the disclosure.

FIG. 6 is a flow diagram illustrating an example process 600 of analyzing radar data to determine drivable and non-drivable surfaces for a vehicle traversing an environment. As described below, the vehicle may analyze the radar data to determine noise levels at regions near the vehicle based on object detections, and may use radar response thresholds associated with particular object types and probabilities/confidence levels to determine drivable and non-drivable surfaces in accordance with the various systems and techniques discussed above. In various examples, the operations of process 600 may be performed by one or more components of an autonomous vehicle, such as a perception engine 110 using a radar response threshold component 112, a radar noise estimator 114, a threshold evaluation component 116 and/or various other systems and components described herein.

Process 600 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 602, the autonomous vehicle 102 may receive radar data from a radar device indicating one or more target detections. The radar data may include a number of return signals received based on objects detected within the environment of the autonomous vehicle 102. The return signals, including radio waves reflected from the objects, may have various properties based on the characteristics of the detected objects, such as range, azimuth, elevation, doppler values, received power, SNR, and/or RCS associated with a detected object. In various examples, the radar data received in operation 602 may include either the raw radar signal data, and/or return signal properties derived by the radar device 108 from the raw signal data.

At operation 604, the autonomous vehicle 102 may determine a radar noise level at one or more regions in the environment, based on the target detections within the radar data received in operation 602. In some examples, the perception engine 110 may use a radar noise estimator 114 to determine an estimated noise level (or noise floor) for a region in the environment, based on the properties of the nearby object detections. As described above in reference to FIG. 3, when a larger object is detected at a detection location in the environment, the detection of the larger object may cause noise in the radar data received for regions near to the detection location. For instance, for a particular region the environment, the radar noise estimator 114 may determine an estimated noise level based on the range difference between the particular region and the detection, the doppler difference between the particular region and the detection, and the intensity and/or received power of the detection.

At operation 606, the autonomous vehicle 102 may determine one or more radar response thresholds associated with particular object type(s). As discussed above, radar response thresholds may include RCS thresholds, doppler thresholds, and/or other types of radar data thresholds associated with the radar data received in operation 602 (e.g., an intensity or reflected power value threshold, etc.). In some examples, the radar response threshold component 112 may determine the radar response threshold(s) using one or more distributions associated with a particular object type. For instance, based on predetermined probability or confidence level for detecting pedestrians (e.g., 95%), the radar response threshold component 112 may use a pedestrian RCS distribution 200 to determine a pedestrian RCS threshold value 302 that can be applied to detect 95% of pedestrians that may be present in the environment. Similar techniques may be used to determine radar response thresholds corresponding to different probabilities/confidence levels (e.g., 90%, 95%, 99%, etc.), and different distributions (e.g., doppler distribution 202) may be used to determine different radar response thresholds (e.g., doppler thresholds and/or ranges) for the object type. Additionally, as discussed above, the radar response threshold component 112 may determine different sets of radar response thresholds for different object types (e.g., pedestrians, bicycles, animals, small cars, traffic signs, etc.).

At operation 608, the autonomous vehicle 102 determines whether the radar noise level(s) for a particular region in the environment, determined in operation 604, meets or exceeds the radar response threshold(s) for the object type, determined in operation 606. In some examples, the perception engine 110 may perform a number of comparisons between the radar noise levels determined by the radar noise estimator 114 for different regions in the environment, and the radar response thresholds determined by the radar response threshold component 112 for one or more object types. When the estimated radar noise level for a region meets or exceeds the radar response threshold(s) for an object type (608: Yes), then in operation 610 the perception engine 110 may determine that the region is a non-drivable surface. The determination that a region is non-drivable in operation 610 may correspond to a determination that the estimated noise level at the region is sufficiently high that the region cannot be effectively scanned by the radar device, to assure with a desired confidence level for the particular object type (e.g., 95% of pedestrians) that an object is not concealed at the region. In contrast, when the estimated radar noise level for a region does not exceed the radar response threshold(s) for an object type (608: No), then in operation 612 the perception engine 110 may determine that the region is a drivable surface. The determination in operation 612 may correspond to a determination that the estimated noise level at the region is low enough to allow the perception engine 110 to conclude with the desired confidence level for the particular object type (e.g., 95% of pedestrians) that an object is not concealed at the region.

At operation 614, the perception engine 110 may determine a trajectory for the autonomous vehicle 102 and/or may activate or deactivate additional features (e.g., a CAS, remote teleoperations, autonomous driving functionality, etc.) to control the autonomous vehicle 102 based on the determinations of drivable and non-drivable regions in the environment. In some examples, the perception engine 110 (and/or prediction or planning components) may use a map of the drivable and non-drivable regions in the environment to determine a planning corridor for navigating the autonomous vehicle. For instance, a planning corridor may be determined based at least in part on a width of the autonomous vehicle and/or perception data (e.g., a grid map 400 identifying drivable and non-drivable surfaces) received from the perception engine 110. In some examples, a planning corridor may bound potential trajectories generated by the computing device(s) 106 may select a trajectory for operating the autonomous vehicle 102 from among the potential trajectories to exclude non-drivable surfaces and include drivable surfaces in the grid map 400. The planning corridor may additionally or alternatively be based at least in part on a width of the vehicle and/or tolerances associated with operating the autonomous vehicle 102.

Figure 7:
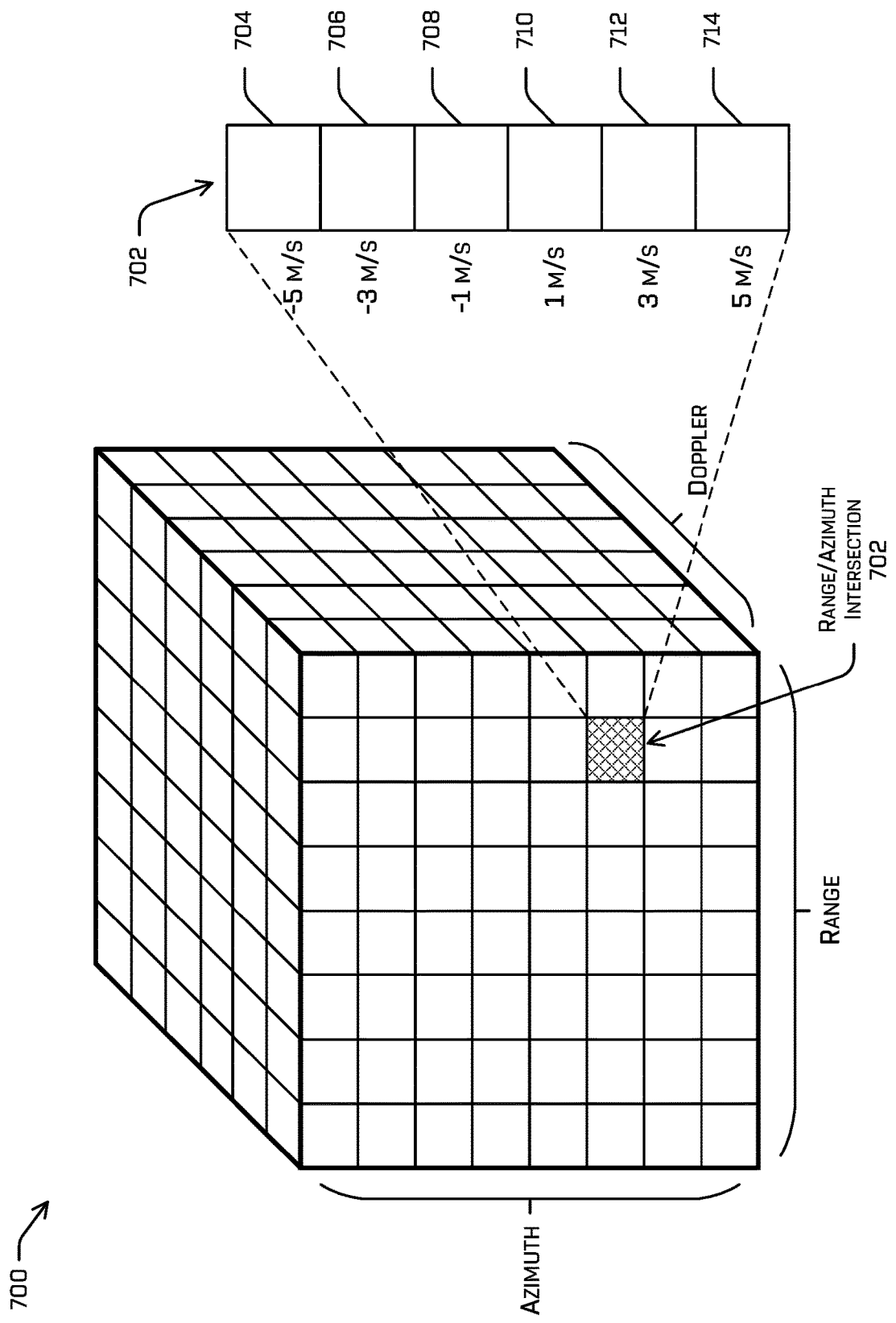
FIG. 7 illustrates a radar data model for determining probabilities of a concealed object at a location based on doppler range probabilities and corresponding radar response thresholds, in accordance with one or more implementations of the disclosure.

FIG. 7 shows a radar data model 700 storing estimated radar noise levels associated with different doppler range probabilities at different regions in an environment. In this example, the radar data model 700 is a multi-dimensional model storing multiple estimated radar noise levels for each region in an environment. A region in this example may correspond to one or more radar cells, and may be represented by the intersection of an azimuth value(s) and range value(s). In other examples, a region may include one or more additional parameters or dimensions (e.g., elevation) instead of or in addition to the azimuth and range values.

As noted above, the side lobe levels (and corresponding radar noise) generated by the detection of a large object in the environment, may be based on the range and doppler differences between the region of the object detection and the region for which the radar noise estimate is being determined. As a result, a single region 702 in the environment (defined by an intersection between a range and azimuth) may have different estimated noise levels, based on the doppler measurement of an object (e.g., pedestrian) that may potentially be present at the region 702. In some examples, the radar noise estimator 114 may determine different estimated radar noise levels for a region, corresponding to the different doppler values. As shown in the radar data model 700, each region in the environment may have multiple different doppler values (or ranges of doppler values). For instance, for region 702 the model may define multiple doppler values 704, 706, 708, 710, 712, and 714 based on the pedestrian doppler distribution 202, and may include a separate radar noise level (e.g., RCS noise) associated with each of the different doppler values 704-714. To illustrate, at region 702 the radar noise estimator 114 may determine a first radar noise level value associated with doppler values 704 (e.g., between −6 m/s and −4 m/s), a second radar noise level value associated with doppler values 706 (e.g., between −4 m/s and −2 m/s), a third radar noise level value associated with doppler values 708 (e.g., between −2 m/s and 0 m/s), and so on.

In this example, to determine an overall RCS threshold associated with the region 702, the threshold evaluation component 116 may use the individual radar noise level values associated with the different doppler values 704-714, along with the probabilities associated with the different doppler values 704-714 (e.g., based on the pedestrian doppler distribution 202. For instance, the probability function used to determine an RCS threshold for the region 702, based on the individual RCS thresholds associated with different doppler values, to correspond to a 95% confidence level that no pedestrians are concealed at the region, represented as follows, according to Equation 1:

$$P_{total}=0.95=P(\text{vel}=-5 \text{ m/s})*P(\text{RCS}<\text{est RCS noise level at }-5 \text{ m/s})+P(\text{vel}=-4 \text{ m/s})*P(\text{RCS}<\text{est RCS noise level at }-4 \text{ m/s})+P(\text{vel}=5 \text{ m/s})*P(\text{RCS}<\text{est RCS noise level at 5 m/s}) \quad \text{Equation 1}$$

In this example, each P (vel=N m/s) represents the probability of a pedestrian moving at N m/s within the environment, and each P(RCS<est RCS noise level at −N m/s) represents the probability that a particular RCS is less than the estimated radar noise level value associated with the same doppler measurement (e.g., N m/s). Using Equation 1, the threshold evaluation component 116 may solve for RCS to determine the RCS threshold that corresponds to the desired probability/confidence level (e.g., 95%) that a pedestrian cannot be concealed at the region. Equation 1 also may be executed with a predetermined RCS term, to solve for the overall probability (which may be more or less than the 0.95 in this example) associated with the same predetermined RCS threshold.

Figure 8:
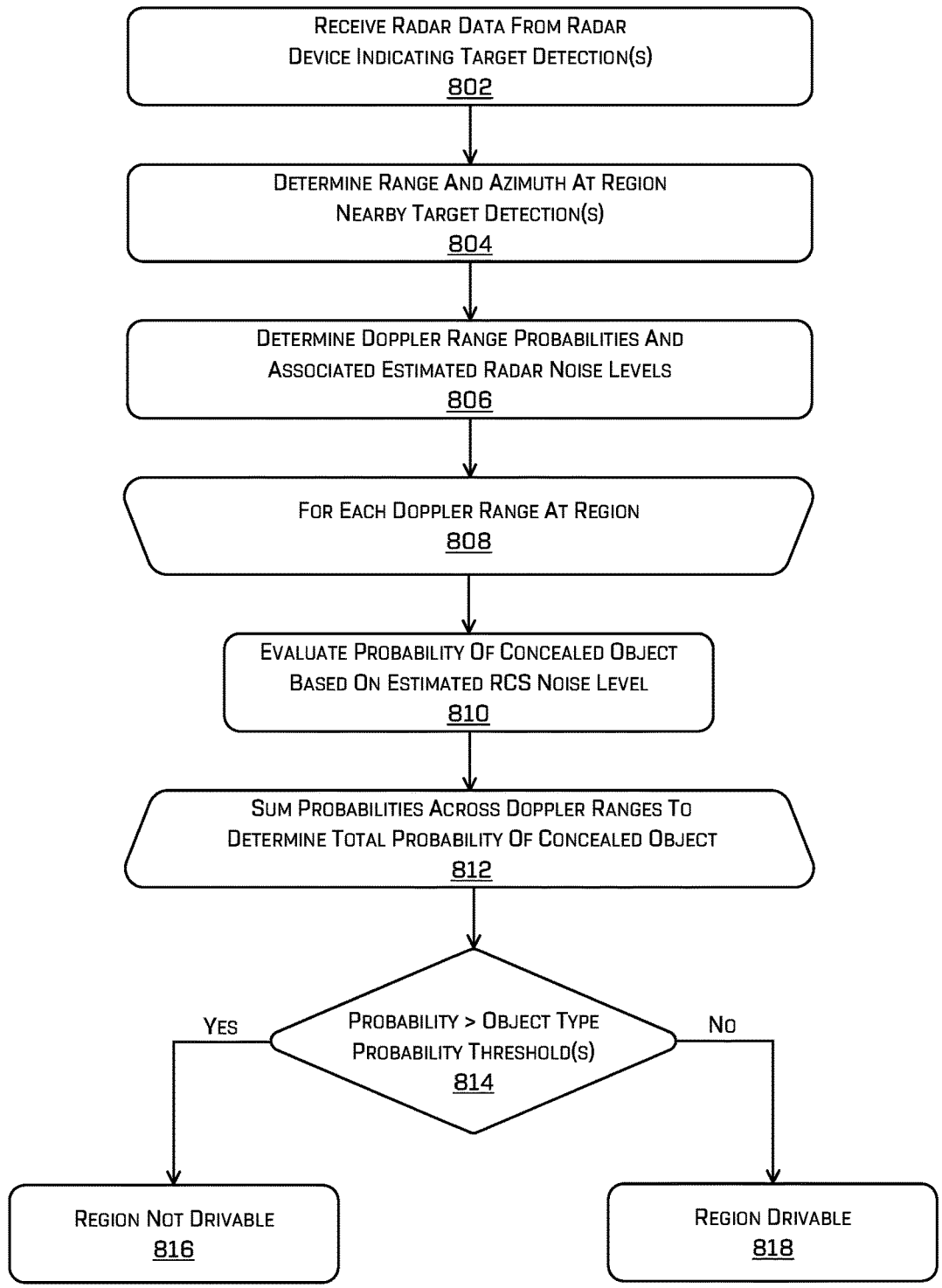
FIG. 8 is a flow diagram illustrating another example process of determining drivable and non-drivable surfaces for controlling a vehicle based on radar data analyses, in accordance with one or more implementations of the disclosure.

FIG. 8 is a flow diagram illustrating another example process 800 of analyzing radar data to determine drivable and non-drivable surfaces for a vehicle traversing an environment. In some examples, process 800 may be similar identical to process 600, described above. However, in this example a single region may have multiple different estimated radar noise levels associated with different doppler values (or ranges of doppler values), and the vehicle may determine individual probabilities associated with the different doppler values and sum the individual probabilities to determine an overall probability associated with the region. As described below, the operations of process 800 may be performed by one or more components of an autonomous vehicle 102, such as a perception engine 110 using a radar response threshold component 112, radar noise estimator 114, threshold evaluation component 116, and/or various other systems and components described herein.

At operation 802, the autonomous vehicle 102 may receive radar data from a radar device indicating one or more target detections. In some examples, operation 802 may be similar or identical to operation 602 described above, in which the radar data includes one or more return signals received based on objects detected in the environment of the autonomous vehicle 102.

At operation 804, the autonomous vehicle 102 may determine a region in the environment, for which the radar data is to be analyzed to determine if the region is a drivable or non-drivable surface. The region may be defined by the intersection of a range value and azimuth value (and/or elevation value) with respect to the radar device 108. In some instances, the region determined may be near one or more radar target detections received in operation 802.

At operation 806, the autonomous vehicle 102 may determine a set of doppler probabilities for an object type (e.g., pedestrians), and corresponding estimated radar noise levels associated with the doppler probabilities. For example, as described above in reference to FIG. 7, a pedestrian or other object type may be associated with different ranges of doppler values (e.g., −5 m/s to 5 m/s), and may have different probabilities associated with each doppler value. These probabilities may be determined based on a pedestrian doppler distribution 202 for pedestrians, or for different doppler distributions associated with different object types. Additionally, because each different doppler value may have a different associated radar noise level, the threshold evaluation component 116 may perform different probability evaluations use different RSC thresholds for each different doppler value.

At operation 808, the threshold evaluation component 116 may determine the different doppler values (or ranges of doppler values) associated with object type, and the estimated radar noise levels associated with each doppler value at the region. At operation 810 the threshold evaluation component 116 may evaluate the probability that an object of the particular object type (e.g., pedestrian) would be concealed by the estimated radar noise at the region at a particular doppler value for the object. For instance, a probability determination in operation 810 may represent the probability that a pedestrian moving at N m/s would be concealed by the radar noise associated with the N m/s doppler value. Accordingly, in operation 810 the threshold evaluation component 116 may use the pedestrian doppler distribution 202 to determine the probability that a pedestrian present at the region would be concealed by the radar noise level associated with the N m/s doppler value (e.g., corresponding to the % of pedestrians having an RCS less than the radar noise level), and multiply that probability by the probability that pedestrian present at the region would be moving at the doppler value of N m/s. As shown in this example, and illustrated above in Equation 1, the determination in operation 810 may be performed iteratively for each different doppler value at which an object (e.g., pedestrian) may potentially be present at the region.

At operation 812, the threshold evaluation component 116 may sum the individual probabilities that a pedestrian would be concealed by the radar noise level at a particular doppler value, across all of the different doppler values associated with the object, to determine a total probability that a pedestrian would be concealed the radar noise at the region. Equation 1 provides an example of summing probabilities that may be similar or identical to the summing in operation 812.

At operation 814, the autonomous vehicle 102 determines whether the total probability determined in operation 812 (e.g., the probability that an object would be concealed the radar noise at the region) is greater than the predetermined probability/confidence level associated with the object type. For example, a predetermined probability of 5% may represent a 95% confidence level that a pedestrian at the region would be detected within the radar data. In some examples, the comparison in operation 814 may be similar or identical to the comparison in operation 608, described above. In this example, when the probability that a pedestrian present at the region would be concealed by the radar noise meets or exceeds the predetermined probability for pedestrians (814: Yes), then in operation 816 the perception engine 110 may determine that the region is a non-drivable surface. As described above, the determination that a region is non-drivable in operation 816 may correspond to a determination that the estimated noise levels (e.g., at different doppler values/ranges) at the region are sufficiently high that the region cannot be effectively scanned by the radar device, to assure with a desired confidence level for the particular object type (e.g., 95% of pedestrians) that an object is not concealed at the region. In contrast, when the probability that a pedestrian present at the region would be concealed by the radar noise does not exceed the predetermined probability for pedestrians (814: No), then in operation 818 the perception engine 110 may determine that the region is a drivable surface. The determination in operation 818 may correspond to a determination that the estimated noise level (e.g., across the different doppler values) at the region is low enough to allow the perception engine 110 to conclude with the desired confidence level for the particular object type (e.g., 95% of pedestrians) that an object is not concealed at the region.

In some examples, during or after operations 816 and 818, the perception engine 110 may determine a trajectory for the autonomous vehicle 102 and/or may activate or deactivate additional features (e.g., a CAS, remote teleoperations, autonomous driving functionality, etc.) to control the autonomous vehicle 102. For example, the perception engine 110 may use techniques similar or identical to those in operation 614 to control the autonomous vehicle based on the determinations of drivable and non-drivable regions in the environment. Additionally, although certain examples above are described in reference determining probabilities that a pedestrian would be concealed by the radar noise level(s) in a region, in other examples similar or identical techniques may be used to determine the probabilities for different object types. For instance, a perception engine 110 may determine different grid maps having different drivable and non-drivable surfaces defined for different object types.

Figure 9:
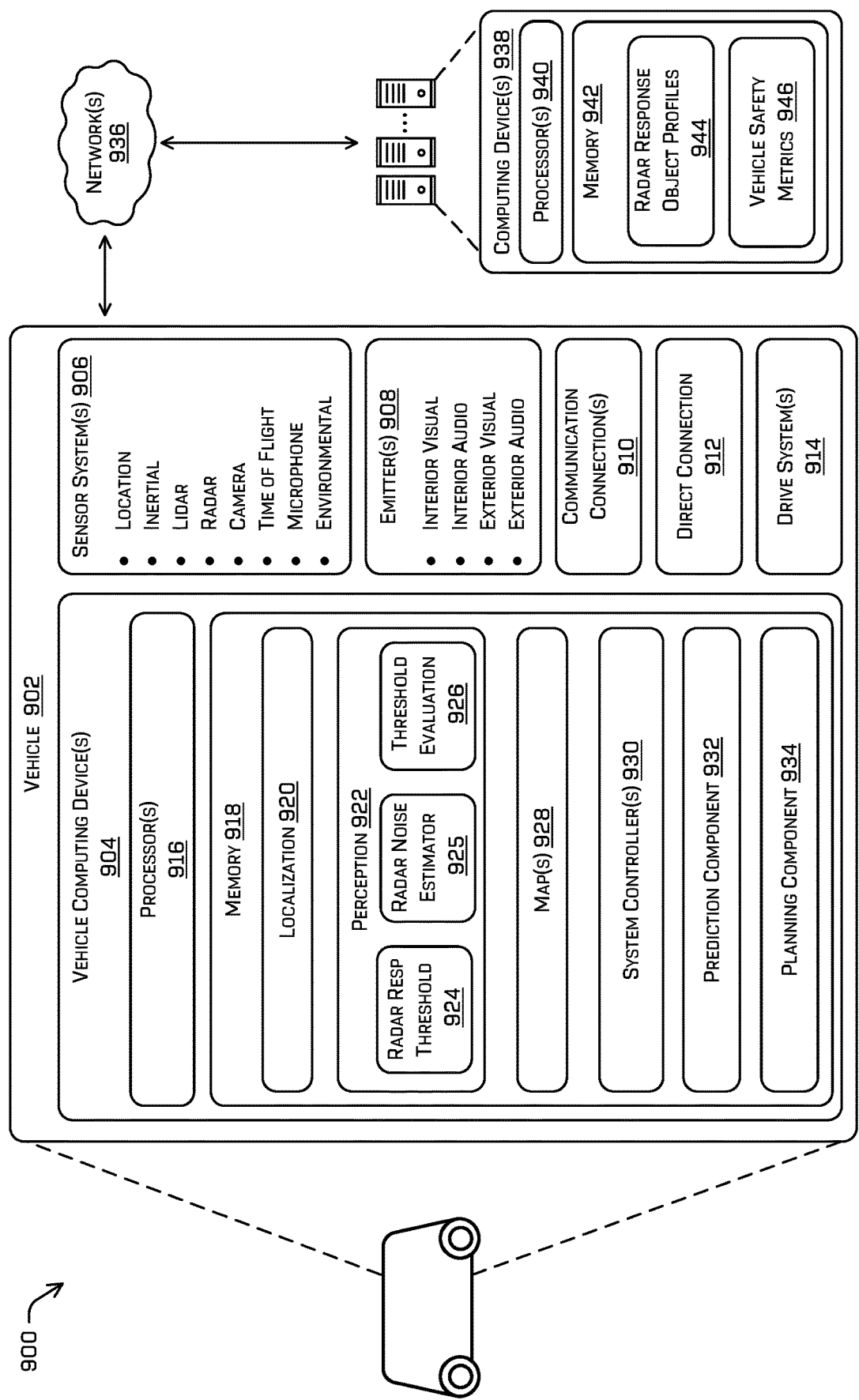
FIG. 9 depicts a block diagram of an example system for implementing various techniques described herein.

FIG. 9 depicts a block diagram of an example system 900 for implementing various techniques described herein. In at least one example, the system 900 can include a vehicle 902, which can correspond to an autonomous or semi-autonomous vehicle configured to perform object perception and prediction functionality, route planning and/or optimization. As described below, the vehicle 902 may include components configured to analyze radar detect to detect potential concealed objects within radar noise. For example, vehicle 902 may be similar or identical to the autonomous vehicle 102 described above, and may include similar or identical components to the perception engine 110, prediction and/or planning components, radar response threshold component 112, the radar noise estimator 114 and/or threshold evaluation component 116. The example vehicle 902 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 902 can be configured to control all functions from start to completion of the trip, including all parking functions, it may not include a driver and/or controls for driving the vehicle 902, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 902 can include vehicle computing device(s) 904, one or more sensor systems 906, one or more emitters 908, one or more communication connections 910, at least one direct connection 912, and one or more drive systems 914.

The vehicle computing device(s) 904 can include one or more processors 916 and memory 918 communicatively coupled with the one or more processors 916. In the illustrated example, the vehicle 902 is an autonomous vehicle; however, the vehicle 902 could be any other type of vehicle or robotic platform. In the illustrated example, the memory 918 of the vehicle computing device(s) 904 stores a localization component 920, a perception component 922, a radar response threshold component 924, a radar noise estimator 925, an threshold evaluation component 926, one or more maps 928, one or more system controllers 930, a prediction component 932, and a planning component 934. Though depicted in FIG. 9 as residing in the memory 918 for illustrative purposes, one or more of the localization component 920, the perception component 922, the radar response threshold component 924, the radar noise estimator 925, the threshold evaluation component 926, the maps 928, the system controllers 930, the prediction component 932, and the planning component 934 can additionally, or alternatively, be accessible to the vehicle 902 (e.g., stored on, or otherwise accessible by, memory remote from the vehicle 902).

In at least one example, the localization component 920 can include functionality to receive data from the sensor system(s) 906 to determine a position and/or orientation of the vehicle 902 (e.g., one or more of an x-, y-, z-position, roll, pitch, or yaw). For example, the localization component 920 can include and/or request/receive a map of an environment and can continuously determine a location and/or orientation of the autonomous vehicle within the map. In some instances, the localization component 920 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 920 can provide data to various components of the vehicle 902 to determine an initial position of an autonomous vehicle for generating a trajectory and/or for determining that an object is proximate to one or more crosswalk regions and/or for identifying candidate reference lines, as discussed herein.

In some instances, and in general, the perception component 922 can include functionality to perform object detection, segmentation, and/or classification. In some examples, the perception component 922 may be similar or identical to the perception engine 110, and can provide processed sensor data that indicates a presence of an entity that is proximate to the vehicle 902 and/or a classification of the entity as an entity type (e.g., car, pedestrian, cyclist, animal, building, tree, road surface, curb, sidewalk, stoplight, stop sign, unknown, etc.). In additional or alternative examples, the perception component 922 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As shown in this example, the perception component 922 can include a radar response threshold component 924, radar noise estimator 925, and/or a threshold evaluation component 926. The radar response threshold component 924, radar noise estimator 925, and threshold evaluation component 926 may perform similar or identical functionality to the radar response threshold component 112, radar noise estimator 114 and threshold evaluation component 116 described above. For example, the radar response threshold component 924 may be configured to determine radar response thresholds that may be applied by the autonomous vehicle 902 while operating in a driving environment. The radar noise estimator 925 may be configured to determine estimations of radar noise (e.g., RCS noise and/or doppler noise) based on detections of objects by one or more radar devices on the vehicle 902. As described above, radar noise may be based on the side lobe levels received in response to a radar transmission signal. The radar noise at a location near a target detection may be based on the range difference between the target detection and the location, the doppler difference between the target detection and the location, and the power (e.g., intensity) of the target detection. The threshold evaluation component 926 may determine and/or store radar response thresholds (e.g., RCS and/or doppler thresholds) associated with particular types of objects (e.g., pedestrians, bicycles, animals, cars, etc.). As described above, object type-specific thresholds for radar responses can be based on object-specific RCS and doppler distributions, and can be tuned based on a desired probability that a location does not contain a concealed object of the object type. The perception component 922 may include functionality to modify and tune the thresholds, and compare the thresholds to the estimated radar noise at various locations to determine drivable and/or non-drivable surfaces around the vehicle 902. As depicted in this example, the radar response threshold component 924, the radar noise estimator 925, and/or threshold evaluation component 926 may be implemented within the perception component 922. However, in other examples one or more of the radar response threshold component 924, the radar noise estimator 925, and/or the threshold evaluation component 926 may be implemented within a prediction component 932, planning component 934, or elsewhere within the vehicle computing device(s) 904.

The memory 918 can further include one or more maps 928 that can be used by the vehicle 902 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 928 can include at least one map (e.g., images and/or a mesh).

In some examples, the vehicle 902 can be controlled based at least in part on the maps 928. That is, the maps 928 can be used in connection with the localization component 920, the perception component 922, the prediction component 932, and/or the planning component 934 to determine a location of the vehicle 902, identify objects in an environment, and/or generate routes and/or trajectories to navigate within an environment.

In some examples, the one or more maps 928 can be stored on a remote computing device(s), such as within the memory 942 of the computing device(s) 938, and may be accessible to the vehicle 902 via network(s) 936. In some examples, multiple maps 928 can be retrieved from the memory 942, and stored based on, for example, a characteristic (e.g., type of entity, time of day, day of week, season of the year, etc.). Storing multiple maps 928 can have similar memory requirements, but can increase the speed at which data in a map can be accessed.

In at least one example, the vehicle computing device(s) 904 can include one or more system controllers 930, which can be configured to control steering, propulsion, braking, safety, emitters, communication, and other systems of the vehicle 902. These system controller(s) 930 can communicate with and/or control corresponding systems of the drive system(s) 914 and/or other components of the vehicle 902. For example, the planning component 934 may generate instructions based at least in part on perception data generated by the perception component 922 (which may comprise any of the radar spatial grids and/or likelihoods discussed herein) and transmit the instructions to the system controller(s) 930, which may control operation of the vehicle 902 based at least in part on the instructions. In some examples, if the planning component 934 receives a notification that a track of an object was "lost" (e.g., an object no longer appears in sensor data that does appear in LIDAR and isn't occluded by any other objects), the planning component 934 may generate an instruction to bring the vehicle 902 to a safe stop and/or to transmit a request for teleoperator assistance.

In general, the prediction component 932 can include functionality to generate predicted information associated with objects in an environment. As an example, the prediction component 932 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 902 traverses an environment. In some examples, the prediction component 932 can generate one or more predicted positions, predicted velocities, predicted trajectories, etc., for such target objects based on attributes of the target object and/or other objects proximate the target object.

In general, the planning component 934 can determine a path for the vehicle 902 to follow to traverse the environment. The planning component 934 can determine various routes and trajectories and various levels of detail. For example, the planning component 934 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 934 can generate an instruction for guiding the autonomous vehicle along at least a portion of the route from the first location to the second location. In at least one example, the planning component 934 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 902 to navigate.

In some instances, the planning component 934 can generate one or more trajectories for the vehicle 902 based at least in part on predicted location(s) associated with object(s) in an environment. In some examples, the planning component 934 can use temporal logic, such as linear temporal logic and/or signal temporal logic, to evaluate one or more trajectories of the vehicle 902.

As can be understood, the components discussed herein (e.g., the localization component 920, the perception component 922, the one or more maps 928, the one or more system controllers 930, the prediction component 932, and the planning component 934) are described as divided for illustrative purposes. However, the operations performed by the various components can be combined or performed in any other component. Further, any of the components discussed as being implemented in software can be implemented in hardware, and vice versa. Further, any functionality implemented in the vehicle 902 can be implemented in the computing device(s) 938, or another component (and vice versa).

In at least one example, the sensor system(s) 906 can include time of flight sensors, lidar sensors, radar devices and/or radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 906 can include multiple instances of each of these or other types of sensors. For instance, the time of flight sensors can include individual time of flight sensors located at the corners, front, back, sides, and/or top of the vehicle 902. As another example, the camera sensors can include multiple cameras disposed at various locations about the exterior and/or interior of the vehicle 902. The sensor system(s) 906 can provide input to the vehicle computing device(s) 904. Additionally or alternatively, the sensor system(s) 906 can send sensor data, via the one or more networks 936, to the one or more computing device(s) 938 at a particular frequency, after a lapse of a predetermined period of time, in near real-time, etc.

The vehicle 902 can also include one or more emitters 908 for emitting light and/or sound, as described above. The emitters 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 can also include one or more communication connection(s) 910 that enable communication between the vehicle 902 and one or more other local or remote computing device(s). For instance, the communication connection(s) 910 can facilitate communication with other local computing device(s) on the vehicle 902 and/or the drive system(s) 914. Also, the communication connection(s) 910 can allow the vehicle to communicate with other nearby computing device(s) (e.g., other nearby vehicles, traffic signals, etc.). The communications connection(s) 910 also enable the vehicle 902 to communicate with a remote teleoperations computing device or other remote services.

The communications connection(s) 910 can include physical and/or logical interfaces for connecting the vehicle computing device(s) 904 to another computing device or a network, such as network(s) 936. For example, the communications connection(s) 910 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 902 can include one or more drive systems 914. The vehicle 902 can have a single drive system 914, or multiple drive systems 914. In at least one example, if the vehicle 902 has multiple drive systems 914, individual drive systems 914 can be positioned on opposite ends of the vehicle 902 (e.g., the front and the rear, etc.). In at least one example, the drive system(s) 914 can include one or more sensor systems to detect conditions of the drive system(s) 914 and/or the surroundings of the vehicle 902. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 914. In some cases, the sensor system(s) on the drive system(s) 914 can overlap or supplement corresponding systems of the vehicle 902 (e.g., sensor system(s) 906).

The drive system(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 914. Furthermore, the drive system(s) 914 also include one or more communication connection(s) that enable communication by the respective drive system with one or more other local or remote computing device(s).

In at least one example, the direct connection 912 can provide a physical interface to couple the one or more drive system(s) 914 with the body of the vehicle 902. For example, the direct connection 912 can allow the transfer of energy, fluids, air, data, etc. between the drive system(s) 914 and the vehicle. In some instances, the direct connection 912 can further releasably secure the drive system(s) 914 to the body of the vehicle 902.

In at least one example, the localization component 920, the perception component 922, the radar response threshold component 924, the radar noise estimator 925, the threshold evaluation component 926, the one or more maps 928, the one or more system controllers 930, the prediction component 932, and the planning component 934 can process sensor data, as described above, and can send their respective outputs, over the one or more network(s) 936, to one or more computing device(s) 938. In at least one example, the respective outputs of the components can be transmitted the one or more computing device(s) 938 at a particular frequency, after a lapse of a predetermined period of time, in near real-time, etc. Additionally or alternatively, the vehicle 902 can send sensor data to one or more computing device(s) 938 via the network(s) 936, including raw sensor data, processed sensor data and/or representations of sensor data. Such sensor data can be sent as one or more log files to the computing device(s) 938 at a particular frequency, after a lapse of a predetermined period of time, in near real-time, etc.

The computing device(s) 938 can include processor(s) 940 and a memory 942 storing one or more radar response object profiles 944 and/or vehicle safety metrics 946. As described above, the radar response object profiles 944 may include response data (e.g., RSC data and/or doppler data) associated with various different object types (e.g., pedestrians, bicycles, animals, cars, etc.). The radar response object profiles 944 may include individual values, distributions, and/or probability or confidence metrics associated with the different object types. The vehicle safety metrics 946 may include collision and safety metrics such as miles per collision, injury or fatality estimations, and the like. In various examples, the computing devices 938 may implement one or more heuristics-based system and/or neural network models to determine the radar response object profiles 944 based on the vehicle safety metrics 946 and/or log data received from vehicle 902 and/or additional vehicles operating within environments. Additionally, any of the features or functionalities described in connection with the radar response threshold component 924, radar noise estimator 925 (e.g., determining estimated radar noise based on radar detections) and/or the threshold evaluation component 926 (e.g., determine object-type specific probabilities and thresholds) also may be performed using heuristics-based techniques and/or neural network models and algorithms. In this example, neural networks are algorithms which pass input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Any type of machine learning can be used consistent with this disclosure.

The processor(s) 916 of the vehicle 902 and the processor(s) 940 of the computing device(s) 938 can be any suitable processor capable of executing instructions to process data and perform operations as described herein. By way of example and not limitation, the processor(s) 916 and 940 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 918 and 942 are examples of non-transitory computer-readable media. The memory 918 and 942 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 9 is illustrated as a distributed system, in alternative examples, components of the vehicle 902 can be associated with the computing device(s) 938 and/or components of the computing device(s) 938 can be associated with the vehicle 902. That is, the vehicle 902 can perform one or more of the functions associated with the computing device(s) 938, and vice versa.

EXAMPLE CLAUSES

A. A system comprising: one or more processors; and one or more non-transitory computer-readable media storing computer-executable instructions that, when executed, cause the system to perform operations comprising: receiving radar data from a radar device associated with a vehicle operating in an environment, the radar data indicating a detection associated with a first location in the environment; determining, based at least in part on the radar data, a radar noise level associated with a second location in the environment; determining a vehicle safety metric associated with the vehicle; determining a radar response threshold based at least in part on the vehicle safety metric; and generating a trajectory for the vehicle, based at least in part on comparing the radar response threshold to the radar noise level associated with the second location.

B. The system as recited in paragraph A, wherein the vehicle safety metric is associated with an object type, and wherein determining the radar response threshold is further based at least in part on a radar response distribution associated with the object type.

C. The system as recited in paragraph A, wherein determining the radar response threshold comprises: determining a first number of false positive detections associated with the radar response threshold; determining a second number of false negative detections associated with the radar response threshold; determining a third number of true positive detections associated with the radar response threshold; and determining a third number of true negative detections associated with the radar response threshold.

D. The system as recited in paragraph A, the operations further comprising: determining, based at least in part on the radar data, a second radar noise level associated with a third location in the environment, wherein generating the trajectory for the vehicle comprises generating a trajectory that excludes the second location and includes the third location, based at least in part on: determining that the radar noise level associated with the second location meets or exceeds the radar response threshold; and determining that the second radar noise level associated with the third location is below the radar response threshold.

E. The system as recited in paragraph A, the operations further comprising: determining a drivable surface metric associated with the vehicle, wherein determining the radar response threshold is further based at least in part on the drivable surface metric.

F. A method comprising: receiving radar data associated with a region in an environment; determining radar noise data associated with the region; evaluating the radar data based at least in part on a radar response threshold for a vehicle, and the radar noise data, wherein the radar response threshold is based at least in part on a vehicle safety metric; and controlling a vehicle in the environment, based at least in part on the radar response threshold and the radar data.

G. The method of paragraph F, wherein the vehicle safety metric is associated with a first object type, and wherein the method further comprises: determining a probability associated with detecting an object of the first object type at a first location in the environment, based at least in part on the radar noise data and a radar response distribution associated with the first object type; and determining the radar response threshold based at least in part on the probability.

H. The method of paragraph G, further comprising: determining a second radar response threshold associated with a second object type, based at least in part on the radar noise data and a second radar response distribution associated with the second object type; and determining a second probability associated with detecting a second object of the second object type at the first location, based at least in part on the radar noise data and the second radar response distribution.

I. The method of paragraph F, further comprising: determining a first radar response threshold; determining a first number of false positive radar detections and a first number of false negative radar detections associated with the first radar response threshold; determining a second radar response threshold; determining a second number of false positive radar detections and a second number of false negative radar detections associated with the second radar response threshold; and determining either the first radar response threshold or the second radar response threshold as the radar response threshold, based at least in part on the first number of false positive radar detections and the second number of false positive radar detections, and the first number of false negative radar detections and the second number of false negative radar detections.

J. The method of paragraph F, further comprising: determining a drivable surface metric associated with operating the vehicle in the environment; and determining the radar response threshold based at least in part on the drivable surface metric.

K. The method of paragraph F, further comprising: determining, based at least in part on the radar noise data, a first radar noise level associated with a first location in the environment, and a second radar noise level associated with a second location in the environment; generating a trajectory for the vehicle that excludes the first location and includes the second location, based at least in part on: determining that the first radar noise level meets or exceeds the radar response threshold; and determining that the second radar noise level is below the radar response threshold.

L. The method of paragraph F, wherein determining the radar noise data comprises: determining a first location in the environment associated with the radar data; and determining a radar noise level associated with a second location in the environment, is based at least in part on a difference in range from a radar device between the first location and the second location, and an intensity measurement associated with the radar data.

M. The method of paragraph L, further comprising: receiving the radar data from the radar device associated with the vehicle; receiving additional sensor data associated with the second location, from a sensor device having a sensor modality different from the radar device; and determining a trajectory for the vehicle based at least in part on a comparison of the radar response threshold to the radar noise level associated with the second location, and the additional sensor data associated with the second location.

N. The method of paragraph F, further comprising: determining a first vehicle safety metric associated with a first environment; determining a second vehicle safety metric associated with a second environment; determining an operating environment of the vehicle; and determining either the first vehicle safety metric or the second vehicle safety metric as the vehicle safety metric, based at least in part on the operating environment of the vehicle.

O. One or more non-transitory computer-readable media storing processor-executable instructions that, when executed by one or more processors, cause the one or more processors to perform operations comprising: receiving radar data associated with a region in an environment; determining radar noise data associated with the region; evaluating the radar data based at least in part on a radar response threshold for a vehicle, and the radar noise data, wherein the radar response threshold is based at least in part on a vehicle safety metric; and controlling a vehicle in the environment, based at least in part on the radar response threshold and the radar data.

P. The one or more non-transitory computer-readable media of paragraph O, wherein the vehicle safety metric is associated with a first object type, and wherein the operations further comprise: determining a probability associated with detecting an object of the first object type at a first location in the environment, based at least in part on the radar noise data and a radar response distribution associated with the first object type; and determining the radar response threshold based at least in part on the probability.

Q. The one or more non-transitory computer-readable media of paragraph P, the operations further comprising: determining a second radar response threshold associated with a second object type, based at least in part on the radar noise data and a second radar response distribution associated with the second object type; and determining a second probability associated with detecting a second object of the second object type at the first location, based at least in part on the radar noise data and the second radar response distribution.

R. The one or more non-transitory computer-readable media of paragraph O, the operations further comprising: determining a first radar response threshold; determining a first number of false positive radar detections and a first number of false negative radar detections associated with the first radar response threshold; determining a second radar response threshold; determining a second number of false positive radar detections and a second number of false negative radar detections associated with the second radar response threshold; and determining either the first radar response threshold or the second radar response threshold as the radar response threshold, based at least in part on the first number of false positive radar detections and the second number of false positive radar detections, and the first number of false negative radar detections and the second number of false negative radar detections.

S. The one or more non-transitory computer-readable media of paragraph O, the operations further comprising: determining a drivable surface metric associated with operating the vehicle in the environment; and determining the radar response threshold based at least in part on the drivable surface metric.

T. The one or more non-transitory computer-readable media of paragraph O, the operations further comprising: determining, based at least in part on the radar noise data, a first radar noise level associated with a first location in the environment, and a second radar noise level associated with a second location in the environment; generating a trajectory for the vehicle that excludes the first location and includes the second location, based at least in part on: determining that the first radar noise level meets or exceeds the radar response threshold; and determining that the second radar noise level is below the radar response threshold.

U. A system comprising: one or more processors; and one or more non-transitory computer-readable media storing computer-executable instructions that, when executed, cause the system to perform operations comprising: receiving first radar data from a radar device, the first radar data indicating a detection associated with a first object in an environment, wherein the first radar data includes doppler data associated with the first object and radar reflected power data associated with the first object; receiving second radar data from the radar device, the second radar data indicating a detection associated with a second possible object in the environment, wherein the second radar data includes doppler data associated with the second possible object and radar reflected power data associated with the second possible object; determining a probability distribution associated with the second radar data, based on an object type of the second possible object; determining an overlap between the first radar data and the second radar data; determining, based on the overlap and the probability distribution associated with the second radar data, a probability associated with the second radar data being indicative of the second possible object being an object of interest in the environment; and controlling a vehicle in the environment, based at least in part on the probability associated with the second radar data.

V. The system of paragraph U, wherein controlling the vehicle comprises generating a trajectory that excludes a location associated with the second radar data, based at least in part on determining that a radar noise level associated with the second radar data meets or exceeds a radar response threshold associated with the object type.

W. The system of paragraph U, the operations further comprising: determining a first radar noise level and a second radar noise level associated with the second radar data, wherein the first radar noise level is a reflected power value and the second radar noise level is a doppler value; determining a first radar response threshold based at least in part on a reflected power distribution associated with the object type; and determining a second radar response threshold based at least in part on a doppler distribution associated with the object type, wherein controlling the vehicle is based at least in part on comparing the first radar noise level to the first radar response threshold, and comparing the second radar noise level to the second radar response threshold.

X. The system of paragraph U, wherein determining the probability associated with the second radar data comprises: determining a first difference in range between the first radar data and the second radar data; determining a second difference in doppler measurements between the first radar data and the second radar data; determining an intensity measurement associated with the first radar data; and determining a radar noise level associated with second radar data, based at least in part on the first difference, the second difference, and the intensity measurement.

Y. The system of paragraph U, wherein determining the probability associated with the second radar data comprises: determining a range value and an azimuth value associated with the second radar data; and determining a first reflected power threshold and a second reflected power threshold based at least in part on the range value and the azimuth value, wherein the first reflected power threshold is associated with a first doppler value and the second reflected power threshold is associated with a second doppler value.

Z. A method comprising: receiving radar data indicating a detection associated with a first region in an environment, wherein the radar data includes doppler data associated with the detection; determining a radar noise level associated with a second region, based on least in part on the doppler data associated with the detection; determining a radar response threshold associated with an object type; and controlling a vehicle in the environment, based at least in part on the radar noise level associated with the second region and the radar response threshold associated with the object type.

AA. The method of paragraph Z, wherein the radar response threshold includes at least one of a doppler value associated with the object type, a radar cross section value associated with the object type, or a reflected power value associated with the object type.

AB. The method of paragraph Z, wherein the radar response threshold includes a first doppler value associated with the object type, and a second radar cross section value associated with the object type.

AC. The method of paragraph Z, wherein determining the radar noise level associated with the second region comprises: determining a first difference between a first range from a radar device to the first region, and a second range from the radar device to the second region; determining a second difference in doppler measurements between the first region and the second region; and determining an intensity measurement associated with the detection.

AD. The method of paragraph Z, wherein determining the radar response threshold is based at least in part on a doppler distribution associated with the object type.

AE. The method of paragraph Z, wherein determining the radar response threshold comprises: determining a range value and an azimuth value associated with the second region; and determining a first radar response threshold and a second radar response threshold based at least in part on the range value and the azimuth value, wherein the first radar response threshold is associated with a first doppler value and the second radar response threshold is associated with a second doppler value.

AF. The method of paragraph AE, further comprising: determining a first probability associated with the first radar response threshold, and determining a second probability associated with the second radar response threshold, based at least in part on a doppler distribution associated with the object type.

AG. The method of paragraph AF, further comprising: determining a first false negative probability associated with the object type, based at least in part on the first probability and the first radar response threshold; determining a second false negative probability associated with the object type, based at least in part on the second probability and the second radar response threshold; and determining a third false negative probability associated with the second region, based at least in part on the first false negative probability and the second false negative probability.

AH. One or more non-transitory computer-readable media storing processor-executable instructions that, when executed by one or more processors, cause the one or more processors to perform operations comprising: receiving radar data indicating a detection associated with a first region in an environment, wherein the radar data includes doppler data associated with the detection; determining a radar noise level associated with a second region, based on least in part on the doppler data associated with the detection; determining a radar response threshold associated with an object type; and controlling a vehicle in the environment, based at least in part on the radar noise level associated with the second region and the radar response threshold associated with the object type.

AI. The one or more non-transitory computer-readable media of paragraph AH, wherein the radar response threshold includes a first doppler value associated with the object type, and a second radar cross section value associated with the object type.

AJ. The one or more non-transitory computer-readable media of paragraph AH, wherein determining the radar noise level associated with the second region comprises: determining a first difference between a first range from a radar device to the first region, and a second range from the radar device to the second region; determining a second difference in doppler measurements between the first region and the second region; and determining an intensity measurement associated with the detection.

AK. The one or more non-transitory computer-readable media of paragraph AH, wherein determining the radar response threshold is based at least in part on a doppler distribution associated with the object type.

AL. The one or more non-transitory computer-readable media of paragraph AH, wherein determining the radar response threshold comprises: determining a range value and an azimuth value associated with the second region; and determining a first radar response threshold and a second radar response threshold based at least in part on the range value and the azimuth value, wherein the first radar response threshold is associated with a first doppler value and the second radar response threshold is associated with a second doppler value.

AM. The one or more non-transitory computer-readable media of paragraph AL, the operations further comprising: determining a first probability associated with the first radar response threshold, and determining a second probability associated with the second radar response threshold, based at least in part on a doppler distribution associated with the object type.

AN. The one or more non-transitory computer-readable media of paragraph AM, the operations further comprising: determining a first false negative probability associated with the object type, based at least in part on the first probability and the first radar response threshold; determining a second false negative probability associated with the object type, based at least in part on the second probability and the second radar response threshold; and determining a third false negative probability associated with the second region, based at least in part on the first false negative probability and the second false negative probability.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving radar data from a radar device associated with a vehicle operating in an environment, the radar data indicating a detection associated with a first location in the environment;
determining, based at least in part on the radar data, a radar noise level associated with a second location in the environment;
determining a vehicle safety metric associated with the vehicle, the vehicle safety metric comprising a minimum acceptable driving safety standard;
determining a radar response threshold based at least in part on the vehicle safety metric; and
generating a trajectory for the vehicle, based at least in part on comparing the radar response threshold to the radar noise level associated with the second location.

2. The system as recited in claim 1, wherein the vehicle safety metric is associated with an object type, and wherein determining the radar response threshold is further based at least in part on a radar response distribution associated with the object type.

3. The system as recited in claim 1, wherein determining the radar response threshold comprises:
determining a first number of false positive detections associated with the radar response threshold;
determining a second number of false negative detections associated with the radar response threshold;
determining a third number of true positive detections associated with the radar response threshold; and
determining a third number of true negative detections associated with the radar response threshold.

4. The system as recited in claim 1, the operations further comprising:
determining, based at least in part on the radar data, a second radar noise level associated with a third location in the environment,
wherein generating the trajectory for the vehicle comprises generating a trajectory that excludes the second location and includes the third location, based at least in part on:
determining that the radar noise level associated with the second location meets or exceeds the radar response threshold; and
determining that the second radar noise level associated with the third location is below the radar response threshold.

5. The system as recited in claim 1, the operations further comprising:
determining a drivable surface metric associated with the vehicle,
wherein determining the radar response threshold is further based at least in part on the drivable surface metric.

6. A method comprising:
receiving radar data associated with a region in an environment;
determining radar noise data associated with the region;
evaluating the radar data based at least in part on a radar response threshold for a vehicle, and the radar noise data, wherein the radar response threshold is based at least in part on a vehicle safety metric, the vehicle safety metric comprising a minimum acceptable driving safety standard; and
controlling the vehicle in the environment, based at least in part on the radar response threshold and the radar data.

7. The method of claim 6, further comprising:
determining a first radar response threshold;
determining a first number of false positive radar detections and a first number of false negative radar detections associated with the first radar response threshold;
determining a second radar response threshold;
determining a second number of false positive radar detections and a second number of false negative radar detections associated with the second radar response threshold; and
determining either the first radar response threshold or the second radar response threshold as the radar response threshold, based at least in part on the first number of false positive radar detections and the second number of false positive radar detections, and the first number of false negative radar detections and the second number of false negative radar detections.

8. The method of claim 6, further comprising:
determining, based at least in part on the radar noise data, a first radar noise level associated with a first location in the environment, and a second radar noise level associated with a second location in the environment;
generating a trajectory for the vehicle that excludes the first location and includes the second location, based at least in part on:
determining that the first radar noise level meets or exceeds the radar response threshold; and
determining that the second radar noise level is below the radar response threshold.

9. The method of claim 6, wherein determining the radar noise data comprises:
determining a first location in the environment associated with the radar data; and
determining a radar noise level associated with a second location in the environment, is based at least in part on a difference in range from a radar device between the first location and the second location, and an intensity measurement associated with the radar data.

10. The method of claim 9, further comprising:
receiving the radar data from the radar device associated with the vehicle;
receiving additional sensor data associated with the second location, from a sensor device having a sensor modality different from the radar device; and determining a trajectory for the vehicle based at least in part on a comparison of the radar response threshold to the radar noise level associated with the second location, and the additional sensor data associated with the second location.

11. The method of claim 6, further comprising:
determining a first vehicle safety metric associated with a first environment;
determining a second vehicle safety metric associated with a second environment;
determining an operating environment of the vehicle; and
determining either the first vehicle safety metric or the second vehicle safety metric as the vehicle safety metric, based at least in part on the operating environment of the vehicle.

12. One or more non-transitory computer-readable media storing processor-executable instructions that, when executed by one or more processors, cause the one or more processors to perform operations comprising:
receiving radar data associated with a region in an environment;
determining radar noise data associated with the region;
evaluating the radar data based at least in part on a radar response threshold for a vehicle, and the radar noise data, wherein the radar response threshold is based at least in part on a vehicle safety metric, the vehicle safety metric comprising a minimum acceptable driving safety standard; and
controlling the vehicle in the environment, based at least in part on the radar response threshold and the radar data.

13. The one or more non-transitory computer-readable media of claim 12, wherein the vehicle safety metric is associated with a first object type, and wherein the operations further comprise:
determining a probability associated with detecting an object of the first object type at a first location in the environment, based at least in part on the radar noise data and a radar response distribution associated with the first object type; and
determining the radar response threshold based at least in part on the probability.

14. The one or more non-transitory computer-readable media of claim 13, the operations further comprising:
determining a second radar response threshold associated with a second object type, based at least in part on the radar noise data and a second radar response distribution associated with the second object type; and
determining a second probability associated with detecting a second object of the second object type at the first location, based at least in part on the radar noise data and the second radar response distribution.

15. The one or more non-transitory computer-readable media of claim 12, the operations further comprising:
determining a first radar response threshold;
determining a first number of false positive radar detections and a first number of false negative radar detections associated with the first radar response threshold;
determining a second radar response threshold;
determining a second number of false positive radar detections and a second number of false negative radar detections associated with the second radar response threshold; and
determining either the first radar response threshold or the second radar response threshold as the radar response threshold, based at least in part on the first number of false positive radar detections and the second number of false positive radar detections, and the first number of false negative radar detections and the second number of false negative radar detections.

16. The one or more non-transitory computer-readable media of claim 12, the operations further comprising:
determining a drivable surface metric associated with operating the vehicle in the environment; and
determining the radar response threshold based at least in part on the drivable surface metric.

17. The one or more non-transitory computer-readable media of claim 12, the operations further comprising:
determining, based at least in part on the radar noise data, a first radar noise level associated with a first location in the environment, and a second radar noise level associated with a second location in the environment;
generating a trajectory for the vehicle that excludes the first location and includes the second location, based at least in part on:
determining that the first radar noise level meets or exceeds the radar response threshold; and
determining that the second radar noise level is below the radar response threshold.

18. The system of claim 1, the operations further comprising adjusting the vehicle safety metric based at least in part on at least one of: an amount of damage or injury likely to occur in a collision; a type of object with which the vehicle is likely to collide; or a current speed of the vehicle, wherein the radar response threshold is further based at least in part on the adjusted vehicle safety metric.

19. The system of claim 1, the operations further comprising determining a drivable surface metric, wherein determining the radar response threshold is based at least in part on balancing the vehicle safety metric and the drivable surface metric to determine: a safe route for the vehicle in the environment; and a likelihood that an object is concealed by radar noise.

20. The system of claim 1, wherein the minimum acceptable driving safety standard comprises one of: miles per collision/accident rate; injury rate; vehicle damage rate; property damage rate; fatality estimation rate; near-miss collision rate; speed limit violation rate; traffic violation rate; rate of excess braking; rate of excess acceleration; or comfort metric compliance rate.

* * * * *